United States Patent
Oshima

(10) Patent No.: US 8,595,623 B2
(45) Date of Patent: Nov. 26, 2013

(54) IMAGE PROCESSING INCLUDING PROCESS OF OUTPUTTING PREVIEW IMAGE USING DATABASE STORING SYNTHESIZING DATA CORRESPONDING TO FINISH PROCESSING CONDITION

(75) Inventor: Yuzo Oshima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 965 days.

(21) Appl. No.: 12/043,637

(22) Filed: Mar. 6, 2008

(65) Prior Publication Data
US 2008/0218794 A1 Sep. 11, 2008

(30) Foreign Application Priority Data

Mar. 7, 2007 (JP) .................................. 2007-057882
Oct. 3, 2007 (JP) .................................. 2007-260173

(51) Int. Cl.
*G06F 15/00* (2006.01)
(52) U.S. Cl.
USPC ........... 715/274; 715/200; 715/255; 715/256; 358/527; 382/284
(58) Field of Classification Search
USPC ........................ 715/200, 255–256, 772, 821
See application file for complete search history.

(56) References Cited

U.S. PATENT DOCUMENTS

| | | | | |
|---|---|---|---|---|
| 6,134,568 A * | 10/2000 | Tonkin | ........................... | 715/209 |
| 6,771,384 B1 * | 8/2004 | Laverty et al. | ................ | 358/1.15 |
| 6,791,709 B1 * | 9/2004 | Nakamura et al. | ........... | 358/1.18 |
| 6,927,865 B1 * | 8/2005 | Kujirai et al. | ................ | 358/1.12 |
| 7,209,249 B2 * | 4/2007 | Morita | ......................... | 358/1.15 |
| 2003/0002056 A1 * | 1/2003 | Yamaguchi et al. | ........... | 358/1.2 |
| 2004/0190037 A1 * | 9/2004 | Shindoh | ........................ | 358/1.13 |
| 2006/0188175 A1 * | 8/2006 | Takiguchi et al. | ............. | 382/284 |
| 2006/0239708 A1 * | 10/2006 | Kozuka et al. | ................... | 399/75 |
| 2007/0013934 A1 * | 1/2007 | Hashimoto et al. | ........... | 358/1.13 |
| 2007/0086073 A1 * | 4/2007 | Horiuchi | ........................ | 358/527 |
| 2007/0143671 A1 * | 6/2007 | Paterson et al. | ................ | 715/527 |

FOREIGN PATENT DOCUMENTS

| | | |
|---|---|---|
| JP | 2001-51814 | 2/2001 |
| JP | 2004-282439 | 10/2004 |
| JP | 2005-70886 | 3/2005 |
| JP | 3679349 | 5/2005 |
| JP | 2006-48535 | 2/2006 |

OTHER PUBLICATIONS

Japanese Office Action issued Mar. 21, 2012 in patent application No. 2007-260173.

* cited by examiner

*Primary Examiner* — Cesar Paula
*Assistant Examiner* — Mohammed-Ibrahim Zuberi
(74) *Attorney, Agent, or Firm* — Oblon, Spivak, McClelland, Maier & Neustadt, L.L.P.

(57) ABSTRACT

An image processing apparatus is disclosed. The image processing apparatus uses software architecture called pipes-and-filters architecture. The image processing apparatus includes an inputting filter, a processing filter, a printing filter, and a preview image displaying filter. When a preview image of image data to be output is instructed to be displayed, the preview image displaying filter makes an operating section display the preview image.

13 Claims, 16 Drawing Sheets

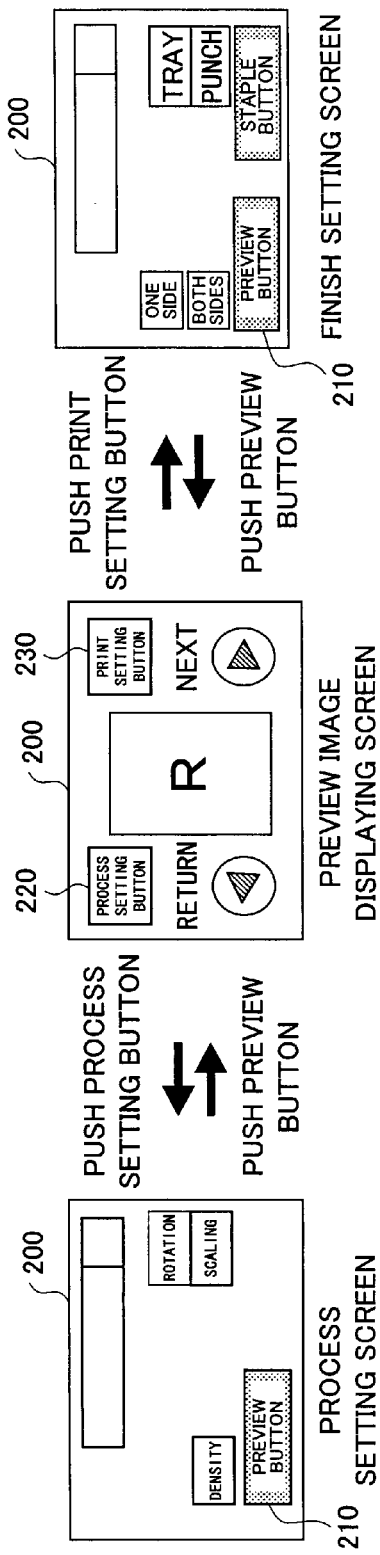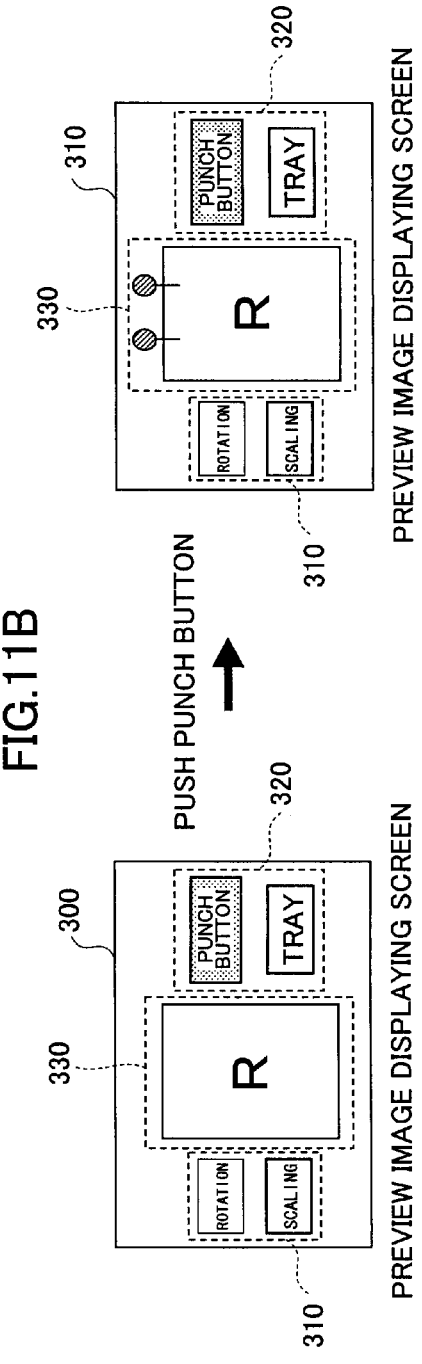

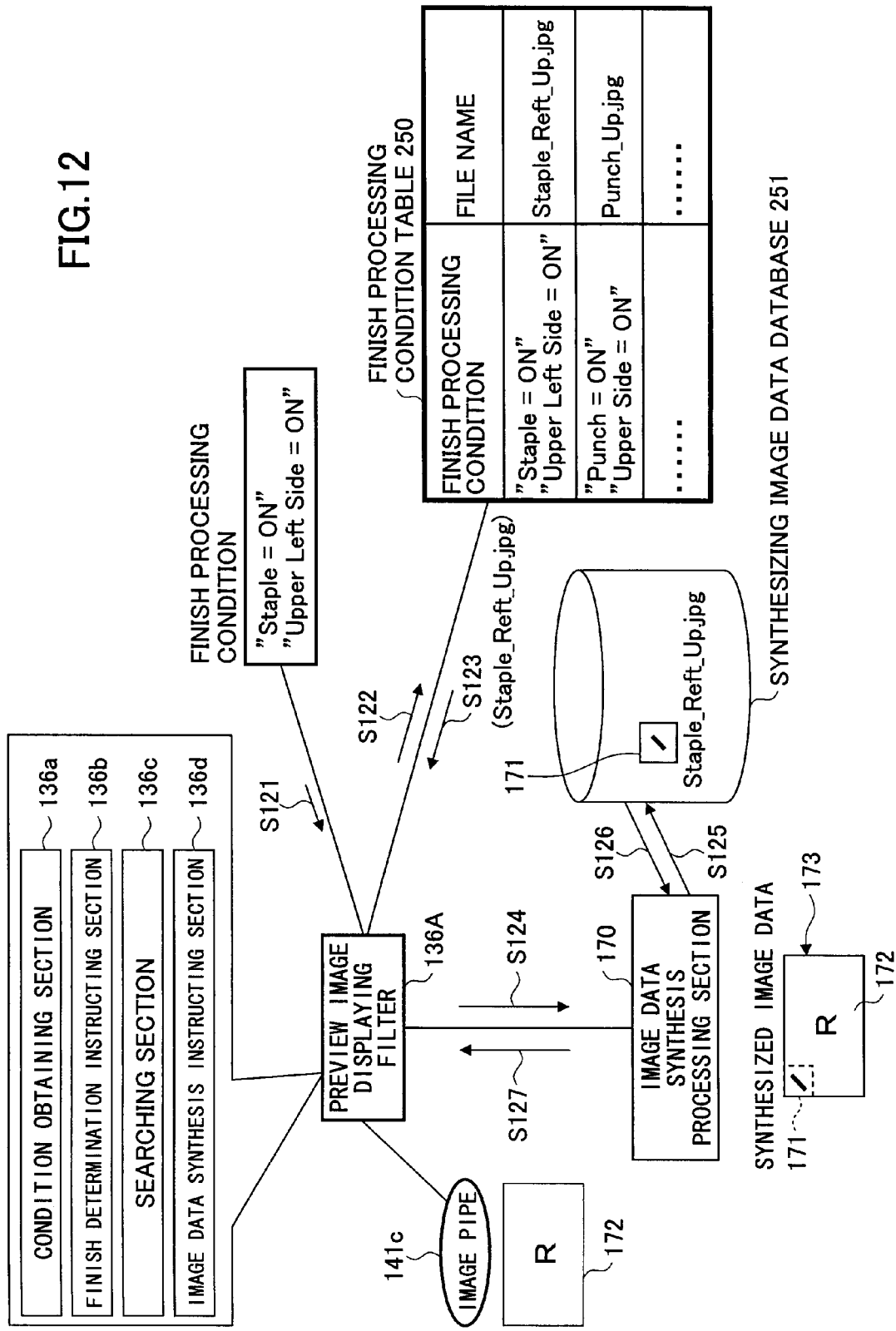

IMAGE PROCESSING INCLUDING PROCESS OF OUTPUTTING PREVIEW IMAGE USING DATABASE STORING SYNTHESIZING DATA CORRESPONDING TO FINISH PROCESSING CONDITION

BACKGROUND OF THE INVENTION

1. Field of the Invention

The present invention generally relates to an image processing apparatus, an image processing method, and a computer-readable recording medium storing an image processing program.

2. Description of the Related Art

Recently, in an image processing apparatus such as a printer, a copying machine, a scanner, and a multifunctional peripheral realizing the above functions in one cabinet, generally, similar to in a computer, a CPU (central processing unit) is provided for realizing the functions by controlling application software.

For example, in an image forming apparatus disclosed in Patent Document 1, functions which are used in common among many pieces of application software are provided as a platform, and one application software package can be installed in the platform by using an API (application programming interface) of the platform. In the image forming apparatus, since the functions which are used in common among the many pieces of application software are provided as the platform, it is avoided that the same function of the many pieces of the application software is installed in the platform multiple times, and developing efficiency of the application software can be increased.

[Patent Document 1] Japanese Patent No. 3679349

However, when the granularity (size) of the function (interface) in the platform is not properly designed, the developing efficiency of the application software may not be increased.

For example, when the granularity is too small, even if the application software supplies a simple service, many APIs are required and the source code becomes complex.

On the contrary, in a case where the granularity is too large, when some application software whose part of the function is changed is desired to be installed in the platform, the platform must be changed. Consequently, the developing labor hours of the application software may be increased. Especially, when the dependence relationship among modules in the platform is great, not only a new function must be added in the platform, but an existing function in the platform may be changed.

In addition, when a part (for example, an image inputting process) of a service being supplied by existing application software is changed, the part and another part related to the changed part must be changed. Consequently, new application software in which source code is described must be installed again in the platform.

SUMMARY OF THE INVENTION

In a preferred embodiment of the present invention, there is provided an image processing apparatus, an image processing method, and a computer-readable recording medium storing an image processing program in which customizing and expanding a function in a platform can be simplified.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus, an image processing method, and a computer-readable recording medium storing an image processing program particularly pointed out in the specification in such full, clear, concise, and exact terms so as to enable a person having ordinary skill in the art to practice the invention.

To achieve one or more of these and other advantages, according to one aspect of the present invention, there is provided an image processing apparatus. The image processing apparatus includes an inputting section to which image data to be processed are input, an inputting filter which controls an inputting process of the image data input to the inputting section, an outputting section from which the processed image data are output, a first outputting filter which controls an outputting process of the image data to be output from the outputting section, a processing filter which controls an image data processing process of the input image data by being connected between the inputting filter and the first outputting filter, and a second outputting filter which controls an outputting process of a preview image of the image data to be output from the outputting section. When an instruction to display the preview image of the image data to be output from the outputting section is received, the second outputting filter is connected to the processing filter.

According to another aspect of the present invention, there is provided an image processing method of an image processing apparatus having an image data inputting section and an image data outputting section. The image processing method includes an inputting step of inputting image data to be processed by the image processing apparatus to the image data inputting section, an image data input controlling step of controlling an inputting process of the image data input to the image data inputting section by an inputting filter, a first image data processing step of processing the image data input to the image data inputting section via the inputting filter by a processing filter, a first image data output controlling step of controlling an outputting process of the image data to be output from the image data outputting section by a first outputting filter, a second image data processing step of processing the image data input to the image data inputting section via the inputting filter by the processing filter for forming a preview image of the image data to be output from the image data outputting section, and a second image data output controlling step of controlling an outputting process of the preview image of the image data to be output from the image data outputting section by a second outputting filter. When an instruction to display the preview image of the image data to be output from the image data outputting section is received, the second image data processing step and the second image data output controlling step are executed.

According to another aspect of the present invention, there is provided a computer-readable recording medium storing an image processing program in an image processing apparatus having an image data inputting section and an image data outputting section. The image processing program includes an inputting step of inputting image data to be processed by the image processing apparatus to the image data inputting section, an image data input controlling step of controlling an inputting process of the image data input to the image data inputting section by an inputting filter, a first image data processing step of processing the image data input to the image data inputting section via the inputting filter by a processing filter, a first image data output controlling step of controlling an outputting process of the image data to be output from the image data outputting section by a first outputting filter, a second image data processing step of processing the image data input to the image data inputting section via the inputting filter by the processing filter for forming a preview image of the image data to be output from the image data outputting section, and a second image data output controlling step of controlling an outputting process of the preview image of the image data to be output from the image data outputting section by a second outputting filter. When an instruction to display the preview image of the image data to be output from the image data outputting section is received, the second image data processing step and the second image data output controlling step are executed.

EFFECT OF THE INVENTION

According to an embodiment of the present invention, the image processing apparatus uses software architecture called pipes-and-filters architecture. Therefore, a dependence relationship does not exist between a first outputting filter and a second outputting filter. Consequently, functions of the first and second outputting filters can be easily expanded or customized (changed) without a change in one filter influencing the other filter.

BRIEF DESCRIPTION OF THE DRAWINGS

Features and advantages of the present invention will become more apparent from the following detailed description when read in conjunction with the accompanying drawings, in which:

FIG. 11A is a diagram showing an operating section of a conventional image processing apparatus;

FIG. 11B is a diagram showing an operating section of the image processing apparatus according to the second embodiment of the present invention;

FIG. 12 is a diagram showing a structure of a preview image displaying filter and processes performed by the preview image displaying filter according to a third embodiment of the present invention;

DESCRIPTION OF THE PREFERRED EMBODIMENTS

Best Mode of Carrying Out the Invention

The best mode of carrying out the present invention is described with reference to the accompanying drawings.

In embodiments of the present invention, software architecture called pipes-and-filters architecture is applied to an image processing apparatus. With this, customizing and expanding a function in a platform is simplified. Further, a filter for outputting a preview image of image data to be output from an image processing apparatus is provided. With this, the preview image is displayed without changing an existing component in the platform.

First Embodiment

Before describing a first embodiment of the present invention, the concept of the pipes-and-filters architecture which is applied to an image processing apparatus according to the embodiments of the present invention is described.

Figure 1:
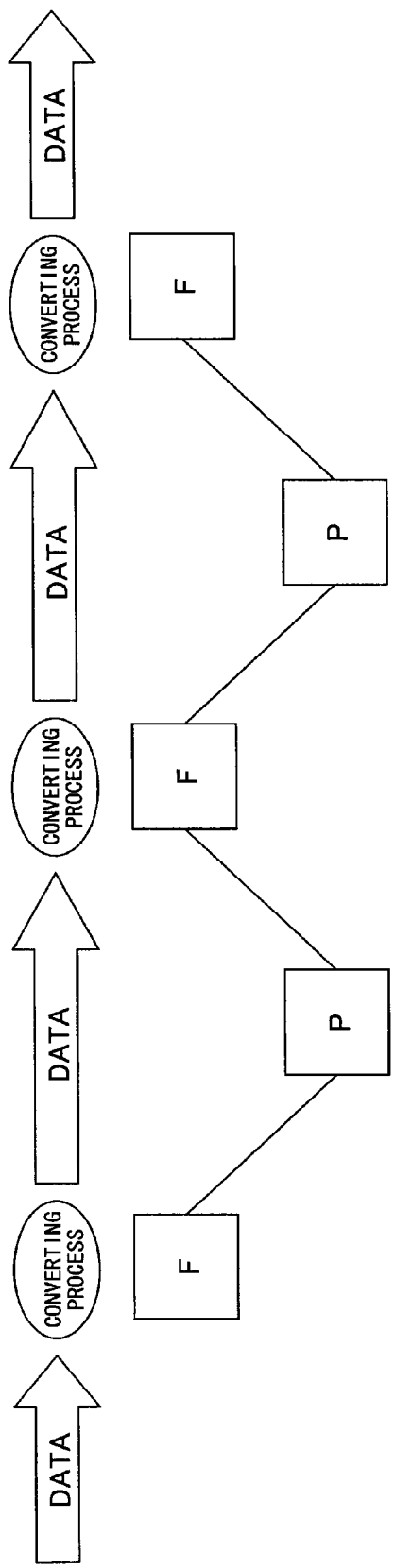
FIG. 1 is a diagram showing the concept of pipes-and-filters architecture which is used in embodiments of the present invention.

FIG. 1 is a diagram showing the concept of the pipes-and-filters architecture. In FIG. 1, "P" shows a pipe and "F" shows a filter.

The filter is a program which applies a predetermined process to input data and outputs a processed result (data). The pipe connects the filters. In a pipe, a processed result output from a filter connected to an input side of the pipe is temporarily stored and the stored result is output to another filter connected to an output side of the pipe. That is, in the pipes-and-filters architecture, processes in the filters can be sequentially executed via the corresponding pipes.

In the present embodiment, the predetermined process to be applied to the input data by the filter is assumed to be a predetermined converting process. That is, in the image processing apparatus of the embodiments of the present invention, functions to be applied to the input data (document) by the image processing apparatus are assumed to be sequential converting processes. In the embodiments of the present invention, it is assumed that the functions of the image processing apparatus are formed of a data (document) inputting process, a data processing process, and a data outputting process. That is, the data inputting process, the data processing process, and the data outputting process are assumed to be the data converting processes, and a software component for realizing one data converting process is the filter.

In the embodiments of the present invention, a filter which controls the data inputting process is named as an inputting filter, a filter which controls the data processing process is named as a processing filter, and a filter which controls the data outputting process is named as a outputting filter. Each filter is an independent program and a dependence relationship does not exist among the filters. Therefore, a filter can be independently installed in and uninstalled from the image processing apparatus.

Next, referring to the drawings, an image processing apparatus 100 according to the first embodiment of the present invention is described.

Figure 2:
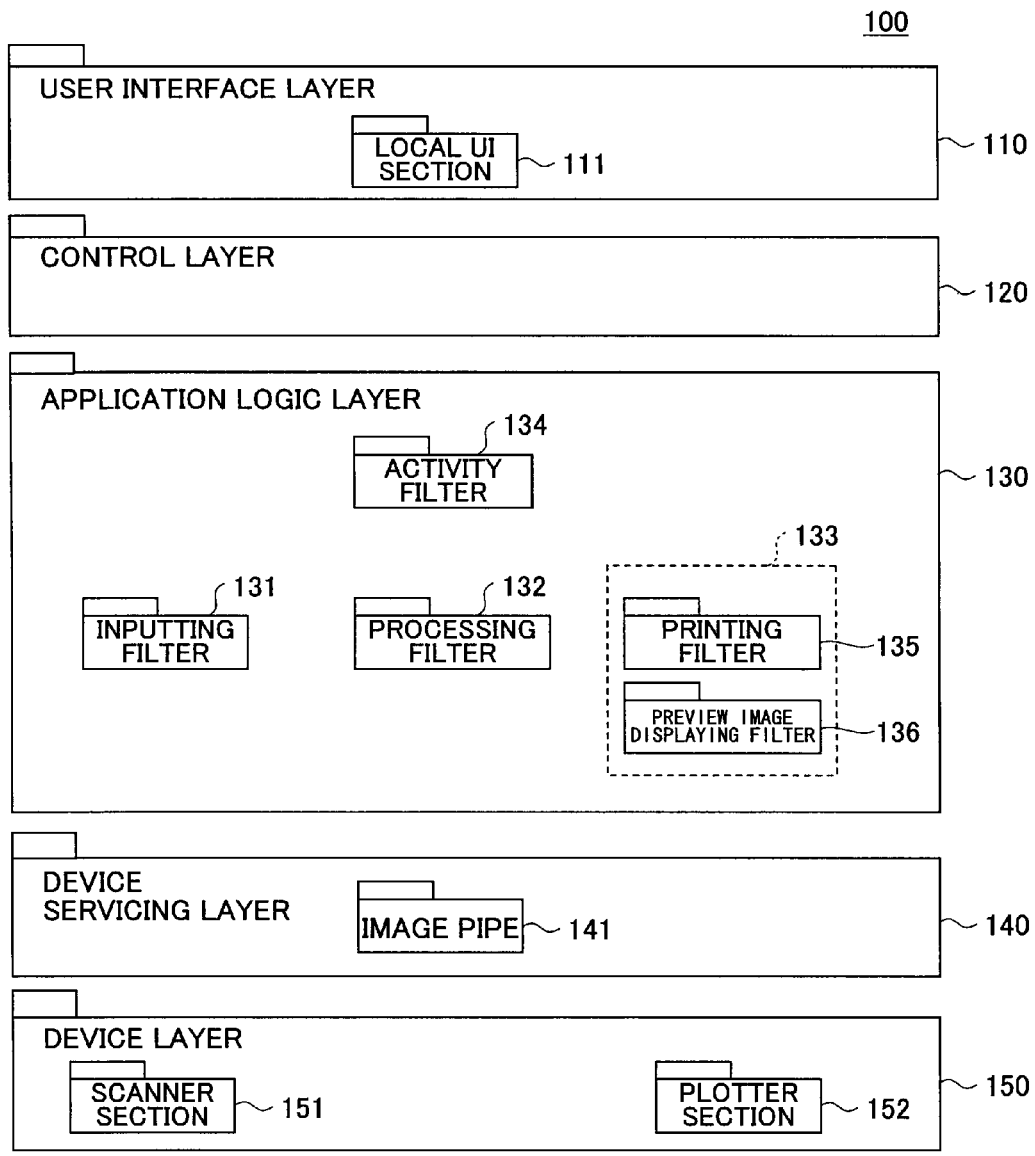
FIG. 2 is a diagram showing a software structure of an image processing apparatus according to a first embodiment of the present invention.

FIG. 2 is a diagram showing a software structure of the image processing apparatus 100 according to the first embodiment of the present invention. The image processing apparatus 100 is a multifunctional apparatus in which plural functions such as a printing function, a copying function, a scanning function, and a facsimile function are installed in one cabinet.

The software structure of the image processing apparatus 100 is a layer structure for realizing the functions. The layer structure includes a user interface layer 110, a control layer 120, an application logic layer 130, a device servicing layer 140, and a device layer 150. The hierarchical relationship among the layers is based on a calling up relationship among the layers. That is, in FIG. 2, an upper layer calls up a lower layer.

When a user instructs the image processing apparatus 100 to execute a function by using the user interface layer 110, the user interface layer 110 calls up the control layer 120 and the control layer 120 controls the application logic layer 130 based on the instruction. The application logic layer 130 executes an application for realizing the function based on an instruction from the control layer 120. The device servicing layer 140 supplies services to the application logic layer 130. The device layer 150 controls hardware resources of the image processing apparatus 100 based on an instruction from the application logic layer 130. By the above operations, the image processing apparatus 100 executes the function instructed by the user at the user interface layer 110.

Next, the layers are described in detail.

The user interface layer 110 includes, for example, a local UI (user interface) section 111, and the local UI section 111 receives an instruction from a user for realizing one of functions of the image processing apparatus 100. The functions are a printing function, a copying function, a scanning function, a facsimile function, and so on. The local UI section 111 can be installed in an operating section (not shown) of the image processing apparatus 100 on which the user operates the image processing apparatus 100. The operating section can be formed of an operating panel having, for example, a display. The instruction received at the user interface layer 110 is sent to the control layer 120.

The control layer 120 includes functions for controlling processes which realize the functions of the image processing apparatus 100. Specifically, the control layer 120 connects filters in the application logic layer 130 based on the instructed function and controls processes for executing the function by using the connected filters. In the present embodiment, a function of the image processing apparatus 100 is defined as one unit of a service (from receiving an instruction to outputting a result of the instruction) supplied to a user, and is an equivalent term of an application which supplies one unit service.

The application logic layer 130 includes filters (components) each of which filters realizes a part of the functions that the image processing apparatus 100 supplies a user. In the application logic layer 130, one function is realized by combining plural filters based on the control of the control layer 120. In the present embodiment, the application logic layer 130 includes an inputting filter 131, a processing filter 132, an outputting filter 133, and an activity filter 134. The filters in the application logic layer 130 are operated by the same definition, and are controlled by the control layer 120 based on the definition. The filters are described below in detail. The activity filter 134 controls processes in the filters for realizing the function.

The device servicing layer 140 includes a function (component) which is used in common among the filters in the application logic layer 130. In the present embodiment, the device servicing layer 140 includes an image pipe 141. The image pipe 141 is the pipe shown in FIG. 1, which transfers a result processed at a filter to another filter. That is, for example, the image pipe 141 can connect the inputting filter 131 to the processing filter 132, and the processing filter 132 to the outputting filter 133.

The device layer 150 includes drivers (programs) for controlling the hardware resources. In the present embodiment, the device layer 150 includes, for example, a scanner section 151 and a plotter section 152. The scanner section 151 controls a scanner (not shown) and the plotter section 152 controls a plotter (not shown).

Next, the filters in the application logic layer 130 are described in detail.

The inputting filter 131 controls an inputting process of data input to the image processing apparatus 100 from an external device. The inputting filter 131 is, for example, a document reading filter, an e-mail receiving filter, a facsimile receiving filter, or a PC (personal computer) document receiving filter. The document reading filter controls reading image data of a document by, for example, a scanner, and outputs the read image data. The e-mail receiving filter controls receiving e-mail and outputs data in the received e-mail. The facsimile receiving filter controls receiving a facsimile and outputs data of the received facsimile. The PC document receiving filter controls receiving data to be printed from, for example, a client PC (not shown), and outputs the received data to be printed. In addition, the inputting filter 131 can include a reporting filter (not shown). Setting information and history information of the image processing apparatus 100 are input to the reporting filter. The reporting filter arranges the setting information and the history information into, for example, a table format, and outputs the arranged information.

The processing filter 132 applies a predetermined process to image data input from an input side filter and outputs a processed result to an output side filter. The predetermined process is, for example, an aggregating process, an enlarging/reducing process, and a rotating process of input image data.

The outputting filter 133 controls an outputting process of data input to the outputting filter 133, processes the input data, and outputs the processed data via the device layer 150. The outputting filter 133 includes a printing filter 135 and a preview image displaying filter 136. In addition to the filters 135 and 136, the outputting filter 133 can include, for example, an e-mail transmitting filter, a facsimile transmitting filter, and a PC document transmitting filter.

The printing filter 135 makes the plotter section 152 output (print) image data on a recording medium. The preview image displaying filter 136 makes the operating section (not shown)

of the image processing apparatus 100 output (display) a preview image of image data to be output.

The e-mail transmitting filter makes an e-mail transmitting function transmit image data to an e-mail address by attaching the image data to e-mail. The facsimile transmitting filter makes a facsimile transmitting function transmit image data to an external device by facsimile. The PC document transmitting filter makes a PC document transmitting function transmit image data to a client PC (not shown).

An instruction input from the local UI section 111 of the user interface layer 110 is input to the activity filter 134 via the control layer 120. The activity filter 134 controls executing jobs in the inputting filter 131, the processing filter 132, and the outputting filter 133 based on the instruction.

The application logic layer 130 realizes the functions in the image processing apparatus 100 by combining the filters in the application logic layer 130. That is, in the image processing apparatus 100, the functions can be realized by combining the filters via the image pipe 141 in the device servicing layer 140. Specifically, for example, when a copying function is executed, the application logic layer 130 combines the document reading filter in the inputting filter 131, the processing filter 132, and the printing filter 135 via the image pipe 141 in the device servicing layer 140.

Figure 3:
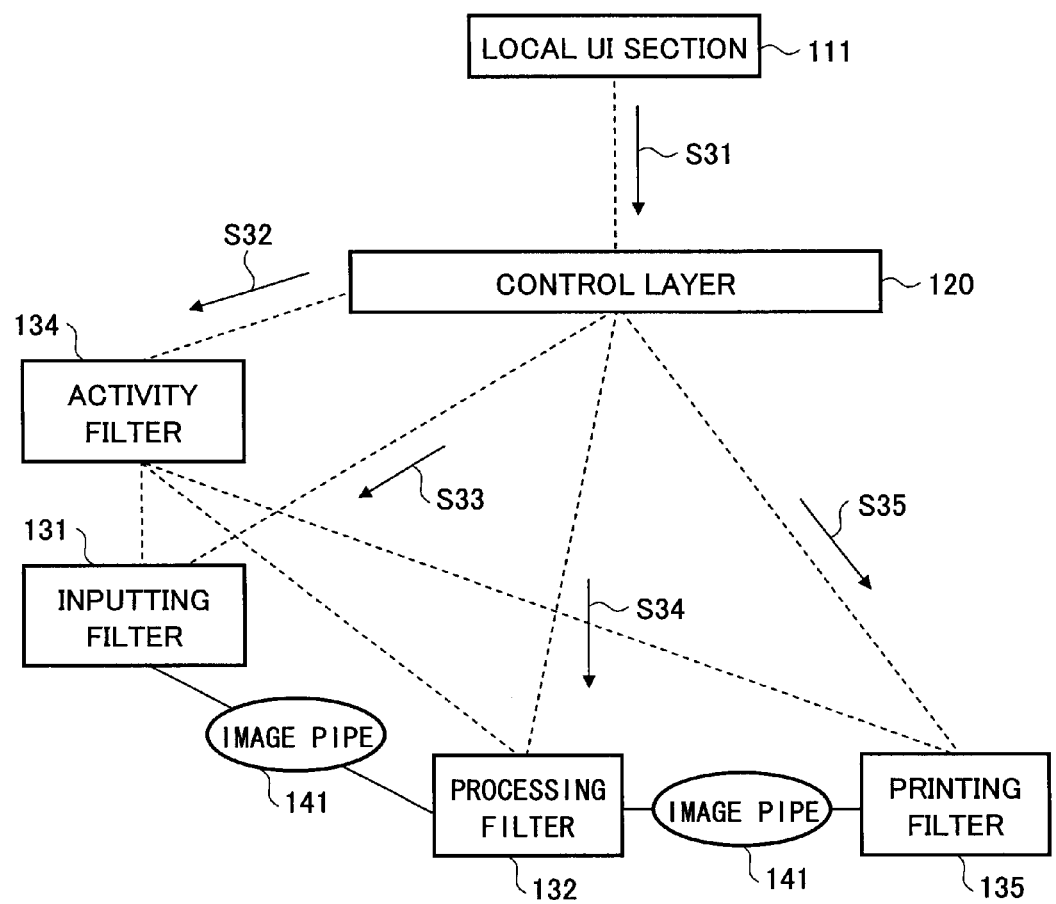
FIG. 3 is a diagram showing a printing process in the image processing apparatus according to the first embodiment of the present invention.

Next, a printing process in the image processing apparatus 100 is described. FIG. 3 is a diagram showing the printing process in the image processing apparatus 100 according to the first embodiment of the present invention.

First, when the local UI section 111 of the user interface layer 110 instructs the control layer 120 to execute a printing process based on a request of the user, the local UI section 111 sends the instruction to the control layer 120 (S31). In the present embodiment, a copying process is described. In this case, the local UI section 111 instructs to read a paper document and to print the read paper document on a recording medium.

Then the control layer 120 instructs the activity filter 134 of the application logic layer 130 to control the filters 131, 132, and 135 (S32). In the image processing apparatus 100, when a user selects a copying function, pushes a start button, or turns on a power switch on the image processing apparatus 100, the control layer 120 instructs the activity filter 134.

When the control layer 120 receives the instruction to read the paper document and to print the read paper document, the control layer 120 connects the inputting filter 131, the processing filter 132, and the printing filter 135 in the application logic layer 130 via the image pipe 141 in the device servicing layer 140. Specifically, at this time, the document reading filter in the inputting filter 131 is connected to the processing filter 132 via the image pipe 141. Then the control layer 120 makes the inputting filter 131 generate a job in the filter (S33), makes the processing filter 132 generate a job in the filter (S34), and makes the printing filter 135 generate a job in the filter (S35).

When the filters 131, 132, and 135 generate corresponding jobs, the activity filter 134 instructs the filters 131, 132, and 135 to execute the corresponding jobs. The inputting filter 131 makes the scanner section 151 (refer to FIG. 2) in the device layer 150 read the paper document and the paper document is read as image data. The read image data are output from the inputting filter 131 and the output image data are input to the processing filter 132 via the image pipe 141.

The processing filter 132 applies a predetermined process to the input image data and the processed image data are output to the printing filter 135 via the image pipe 141. The printing filter 135 makes the plotter section 152 (refer to FIG. 2) in the device layer 150 plot (print) the image data on a recording medium.

Next, a case is described in which a preview image of the image data to be output (copied) is instructed to be displayed when the copying process of the image data is executed.

In the image processing apparatus 100 of the present embodiment, when a preview image of image data to be output is instructed to be displayed, the preview image of the image data can be displayed by connecting the preview image displaying filter 136 to the processing filter 132 via the image pipe 141 without changing existing components (filters).

Figure 4:
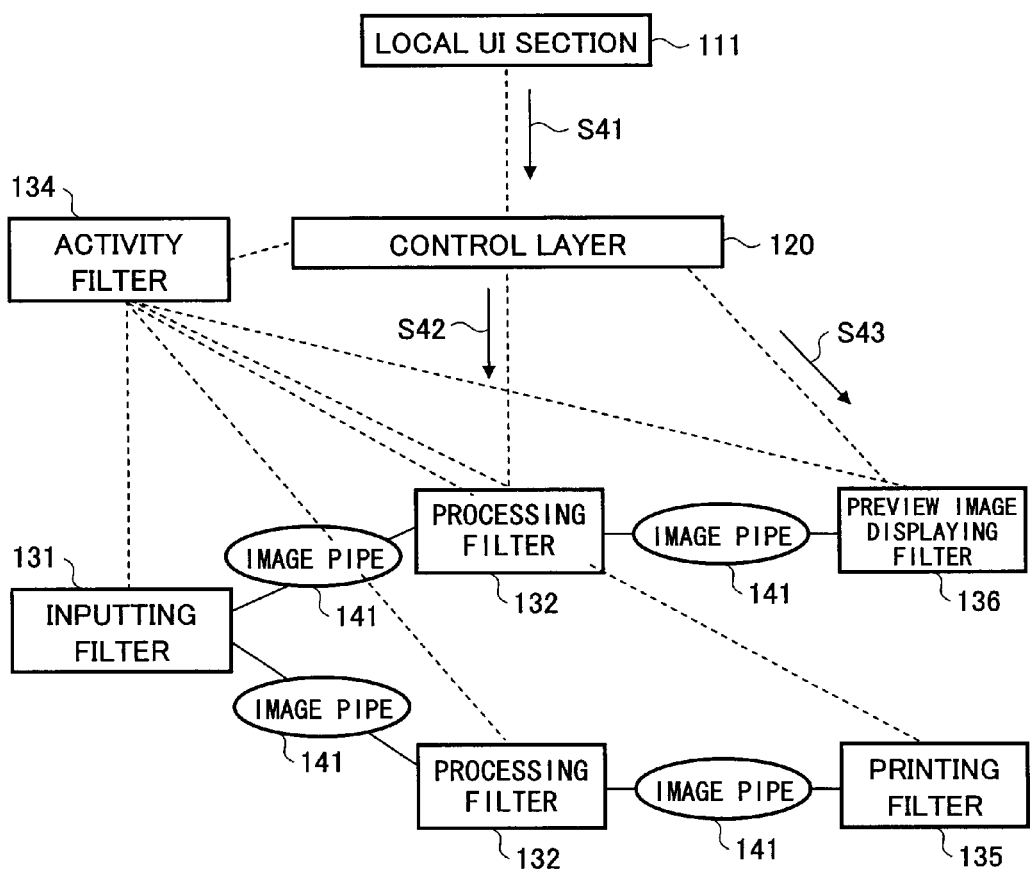
FIG. 4 is a diagram showing a preview image displaying process in the image processing apparatus according to the first embodiment of the present invention.

Referring to FIG. 4, a preview image displaying process in the image processing apparatus 100 is described. FIG. 4 is a diagram showing the preview image displaying process in the image processing apparatus 100 according to the first embodiment of the present invention.

First, when a user instructs the image processing apparatus 100 to display a preview image of image data to be output by using the local UI section 111, the local UI section 111 sends the instruction to the control layer 120 (S41).

When the control layer 120 receives the instruction to display the preview image, the control layer 120 connects the preview image displaying filter 136 to the processing filter 132 via the image pipe 141. Then the control layer 120 makes the processing filter 132 generate a job for forming preview image data to be output to the preview image displaying filter 136 (S42). Further, the control layer 120 makes the preview image displaying filter 136 generate a job for displaying a preview image (S43).

When the jobs in the corresponding filters 132 and 136 are generated, the activity filter 134 instructs the filters 132 and 136 to execute the corresponding jobs. The processing filter 132 applies a predetermined process to image data output from the inputting filter 131 and outputs the processed image data to the preview image displaying filter 136. The preview image displaying filter 136 outputs the processed image data as preview image displaying data.

The preview image displaying data output from the preview image displaying filter 136 can be displayed on the operating section (not shown) of the image processing apparatus 100. The operating section is described below in detail.

The job generated by the processing filter 132 in S42 is the same as the job generated in S34 shown in FIG. 3. Therefore, the processing filter 132 applies the same process as that described in FIG. 3 to the image data. That is, the processing filter 132 executes the job generated by the instruction from the control layer 120 based on the instruction of the activity filter 134 in both the printing process and the preview image displaying process.

As described above, in the image processing apparatus 100 of the present embodiment, when a preview image of image data to be output is instructed to be displayed, the preview image of the image data can be displayed by connecting the preview image displaying filter 136 to the processing filter 132 via the image pipe 141 without changing existing filters. In addition, a dependence relationship does not exist between the printing filter 135 and the preview image displaying filter 136. Therefore, the functions of the printing filter 135 and the preview image displaying filter 136 can be easily expanded or customized (changed) without a change in one filter influencing the other filter.

In addition, since the processing filter 132 applies the same process to input image data, the processing filter 132 can output the same processed image data to the printing filter 135 and the preview image displaying filter 136. Therefore, the image data to be output as the print data can be output as the preview image data.

Figure 5:
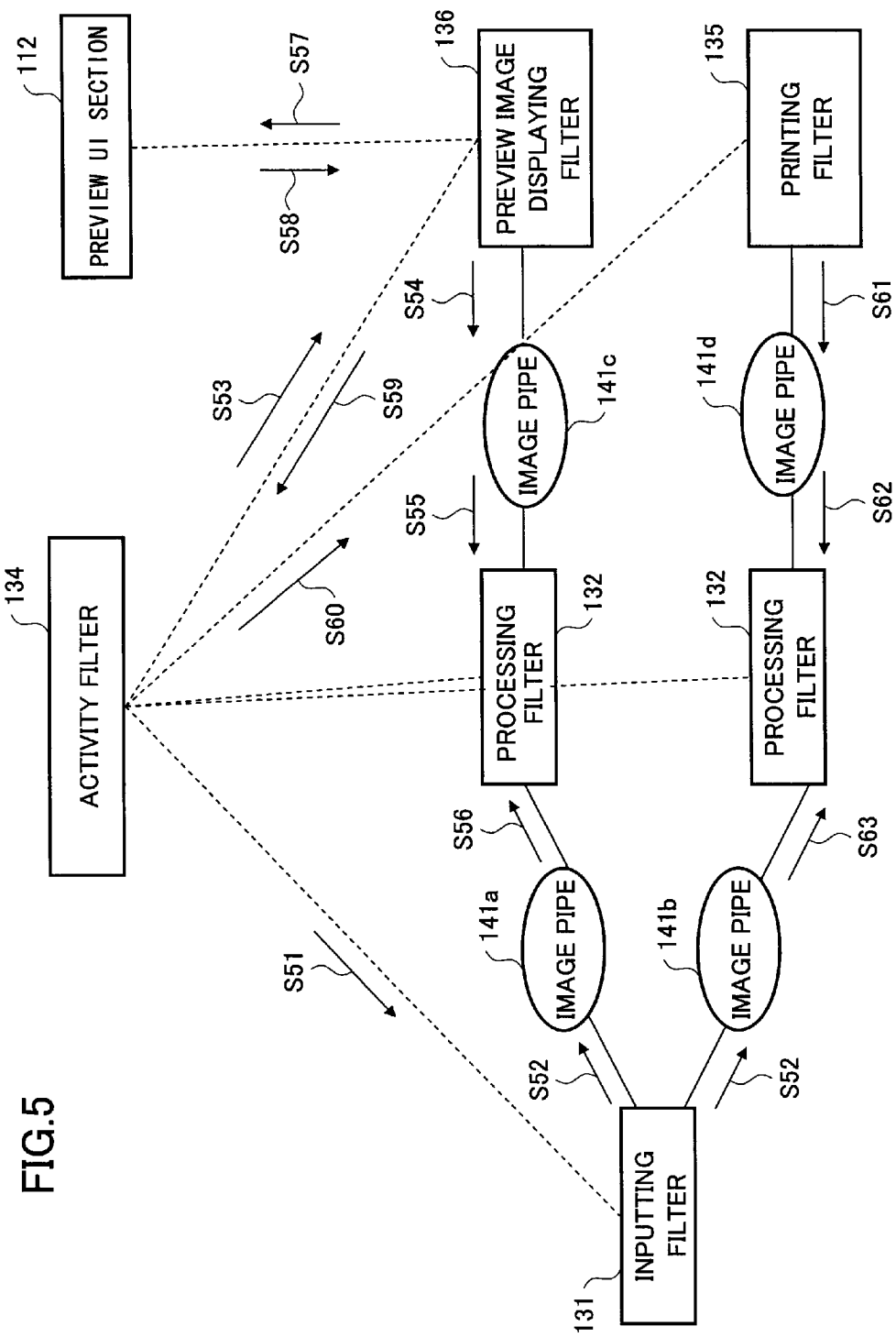
FIG. 5 is a diagram showing processes in which the printing process is executed after executing the preview image displaying process in the image processing apparatus according to the first embodiment of the present invention.

Next, referring to FIG. 5, processes are described in which the printing process is executed after executing the preview image displaying process in the image processing apparatus 100. FIG. 5 is a diagram showing the processes in which the printing process is executed after executing the preview image displaying process in the image processing apparatus 100 according to the first embodiment of the present invention. In FIG. 5, in order to clearly describe the processes, suffixes are attached to the image pipes 141. However, actually, one image pipe 141 can operate as plural image pipes 141a through 141d. Further, two processing filters 132 are shown in FIG. 5; however, actually, one processing filter 132 applies a predetermined process to image data. In addition, in order to avoid redundant description, some processes described above are omitted.

First, when a user instructs the image processing apparatus 100 to display a preview image of image data to be output by using the local UI section 111, the control layer 120 makes the filters 131, 132, 135, and 136 generate corresponding jobs. When the filters 131, 132, 135, and 136 generate the corresponding jobs, the activity filter 134 instructs the inputting filter 131 to execute the job (to read image data) (S51).

The inputting filter 131 reads the image data whose preview image is displayed and whose image data are printed. That is, the inputting filter 131 executes the job. The inputting filter 131 outputs the read image data to the image pipes 141a and 141b (S52). The image data to be output to the image pipes 141a and 141b are the same. That is, actually, the image pipe 141a and the image pipe 141b are one image pipe 141.

When the inputting filter 131 reads the image data, the activity filter 134 instructs the preview image displaying filter 136 to execute the preview image displaying process (S53). The preview image displaying process is the job generated by the preview image displaying filter 136 based on the instruction from the control layer 120.

The preview image displaying filter 136 requests the image pipe 141c to send preview image data to the preview image displaying filter 136 (S54). Since the image pipe 141c does not store the preview image data, the image pipe 141c sends the request to the processing filter 132 (S55). The image processing filter 132 reads the image data from the image pipe 141a (S56), applies a predetermined process to the read image data, and outputs the processed image data to the image pipe 141c.

The preview image displaying filter 136 continues to request the image pipe 141c to send the preview image data until the preview image displaying filter 136 obtains the preview image data. With this, the image data processed by the processing filter 132 are sent to the preview image displaying filter 136.

The preview image displaying filter 136 applies a process to the image data sent from the image pipe 141c for outputting preview image data and outputs preview image data (S57). The preview image data are displayed on the operating section of the image processing apparatus 100 via a preview image UI (user interface) section 112.

When the user instructs to print image data of the preview image data on the operating section via the preview image UI section 112 (S58), the preview image displaying filter 136 sends the report of completion of the preview image displaying process to the activity filter 134 (S59). The preview image displaying process is the job generated by the preview image displaying filter 136 based on the instruction from the control layer 120.

The activity filter 134 instructs the printing filter 135 to execute a printing process of the image data after receiving the completion report of the preview image displaying process (S60). The printing filter 135 requests the image pipe 141d to send the image data to be printed (S61). The image pipe 141d sends the request to the processing filter 132 (S62).

The processing filter 132 reads the image data from the image pipe 141b (S63). The processing filter 132 applies a process to the read image data and outputs the processed image data to the image pipe 141d. The printing filter 135 continues to request the image pipe 141d to send the image data until the printing filter 135 obtains the image data. With this, the image data processed by the processing filter 132 are sent to the printing filter 135 via the image pipe 141d.

When the printing filter 135 obtains the processed image data from the image pipe 141d, the printing filter 135 applies a process to the image data for outputting the image data as print data and makes the plotter section 152 (refer to FIG. 2) output the print data. The print data are printed on a recording medium by a plotter (not shown) based on control of the plotter section 152.

As described above, in the image processing apparatus 100, a preview image of image data to be printed is displayed and also the image data are printed.

In the image processing apparatus 100 of the present embodiment, it is possible that the inputting filter 131 outputs both image data for printing and image data for displaying a preview image. That is, the inputting filter 131 outputs two image data sets different from each other.

Figure 6:
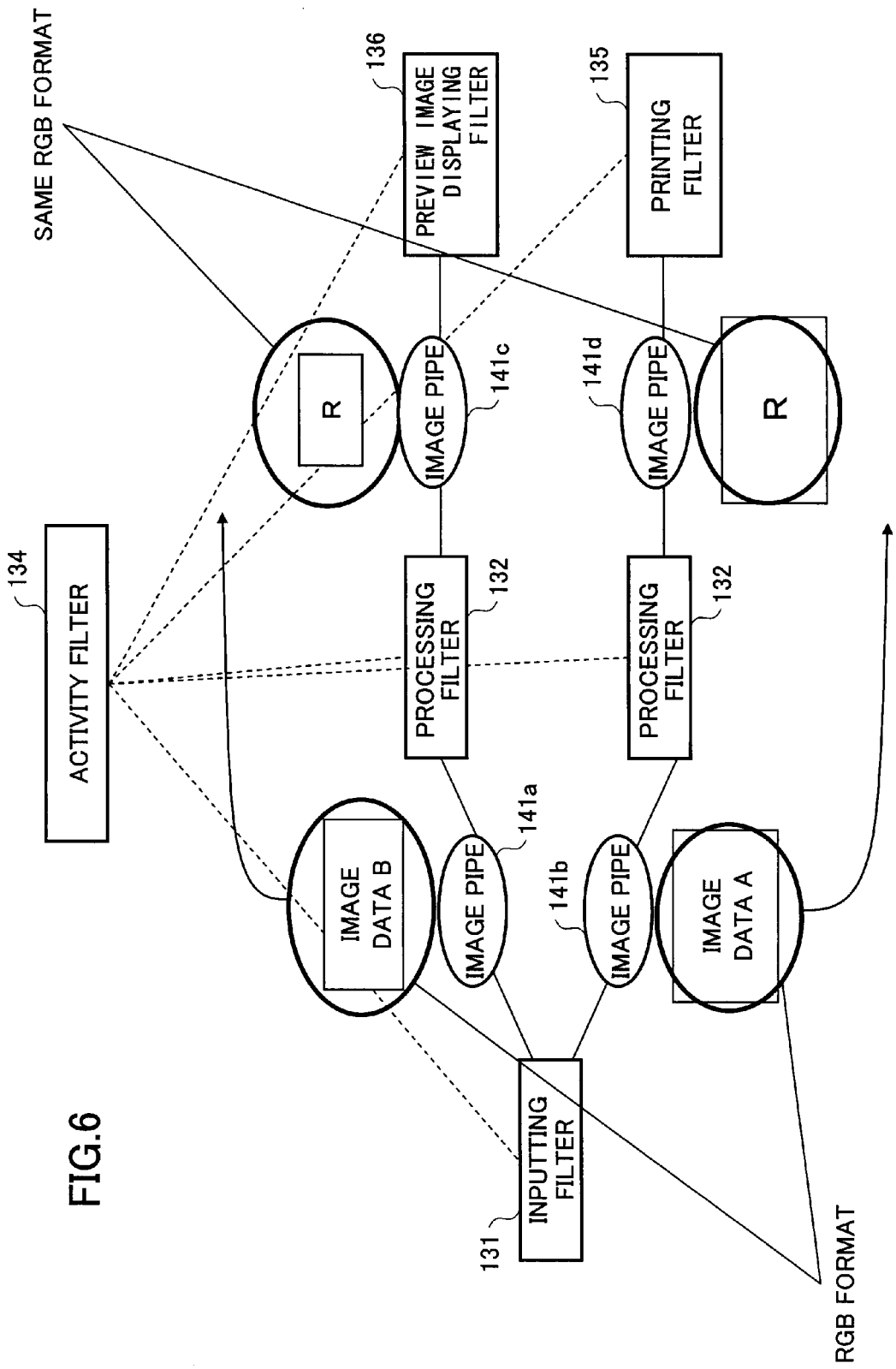
FIG. 6 is a diagram showing processes in which an inputting filter outputs both image data for printing and image data for displaying a preview image according to the first embodiment of the present invention.

Next, referring to FIG. 6, processes are described in which the inputting filter 131 outputs both the image data for printing and the image data for displaying a preview image. FIG. 6 is a diagram showing the processes in which the inputting filter 131 outputs both the image data for printing and the image data for displaying a preview image. In FIG. 6, similar to in FIG. 5, suffixes are attached to the image pipes 141. In addition, in order to avoid redundant description, some processes described above are omitted.

In the inputting process of image data at the inputting filter 131 of the image processing apparatus 100, image data A for printing (outputting) and image data B for displaying a preview image are generated. The inputting filter 131 generates the image data B for displaying the preview image whose resolution is lower than the resolution of the image data A for printing.

The image data A is output to the image pipe 141b, and the processing filter 132 applies a process to the image data A from the image pipe 141b and the processed image data A are output to the printing filter 135 via the image pipe 141d. The image data B are output to the image pipe 141a, and the processing filter 132 applies a process to the image data B from the image pipe 141a and the processed image data B are output to the preview image displaying filter 136 via the image pipe 141c.

Since the resolution of the image data B is lower than the resolution of the image data A, a period during which the processing filter 132 applies a process to the image data B in the preview image displaying process can be shortened. In addition, a resolution converting process in the preview image displaying process is not required. Therefore, the performance in the preview image displaying process can be increased. That is, the time and the workload which are required to display the preview image can be decreased. In the image processing apparatus 100 of the present embodiment, it is determined that the resolution of the image data B for displaying the preview image is, for example, $1/16$ of the resolution of the image data A for printing.

In addition, in the image processing apparatus 100 of the present embodiment, the inputting filter 131 generates the image data A and B with the same data format. With this, the processing filter 132 can apply the same process to the image data A and B. Therefore, even if the resolutions are different between the image data A and B, the preview image data of the same format as that of the image data to be output can be displayed.

In the image processing apparatus 100 of the present embodiment, it is determined that the data format of the image data A and B is the RGB data format. However, the data format is not limited the RGB data format, and can be a data format to which a process can be applied in the processing filter 132.

As described above, in the image processing apparatus 100 of the present embodiment, when a preview image of image data to be output is instructed to be displayed, the preview image of the image data can be displayed by connecting the preview image displaying filter 136 to the processing filter 132 via the image pipe 141 without changing existing components (filters).

As described above, in the image processing apparatus 100 of the present embodiment, the data formats of the image data A and B are the same, and the resolution of the image data B for displaying the preview image is lower than the resolution of the image data A for printing. With this, the period which is required in the preview image displaying process can be shortened, and the preview image whose data format is the same as the data format of the printed image can be obtained.

Second Embodiment

Next, referring to the drawings, a second embodiment of the present invention is described. The second embodiment of the present invention includes an image processing apparatus 100A, and the image processing apparatus 100A includes a finish determining service section which determines a parameter in a finishing process for image data to be output. The functions of the other elements in the second embodiment of the present invention are almost the same as those in the first embodiment of the present invention, and some elements have additional functions compared with the first embodiment; however, the some elements have the corresponding same reference numbers as those in the first embodiment. In the second embodiment of the present invention, points different from the first embodiment of the present invention which points include the finish determining service section are mainly described.

Figure 7:
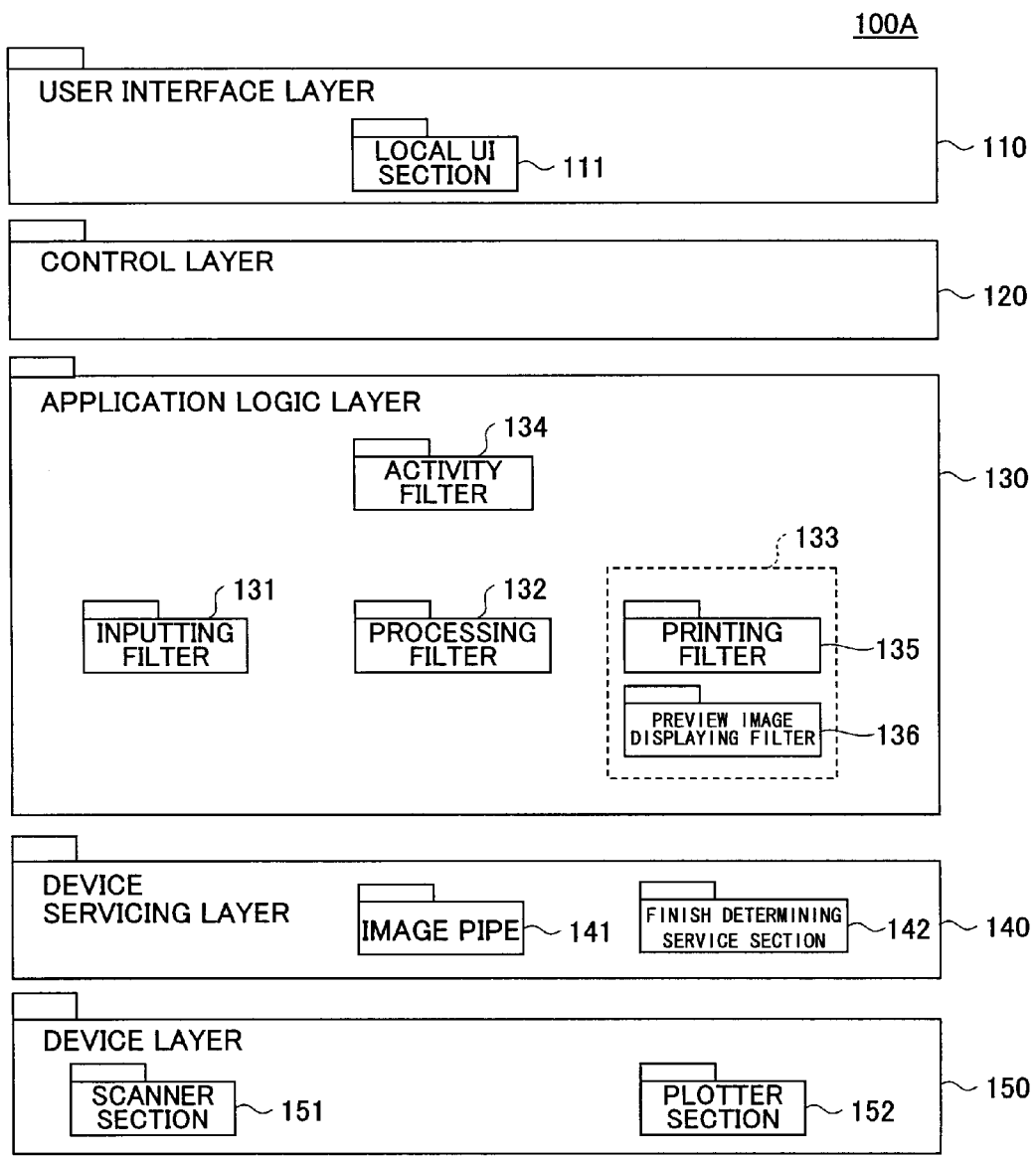
FIG. 7 is a diagram showing a software structure of an image processing apparatus according to a second embodiment of the present invention.

FIG. 7 is a diagram showing a software structure of the image processing apparatus 100A according to the second embodiment of the present invention.

As shown in FIG. 7, the image processing apparatus 100A of the second embodiment of the present invention includes a finish determining service section 142 in the device servicing layer 140. That is, the device servicing layer 140 additionally includes the finish determining service section 142. The finish determining service section 142 calculates and determines a parameter in the finishing process.

In the present embodiment, the finishing process includes, for example, a stapling process for stapling recording media (recording sheets) on which images are printed, and a punching process for punching the printed sheets.

Specifically, in the stapling process, a parameter showing a precise stapling position on the output printed sheets must be determined. In addition, in the punching process, a parameter showing a precise punching position on the output printed sheets must be determined. The finish determining service section 142 calculates and determines the above parameters in the finishing process. That is, the parameter is a precise position of the staple or the punch, for example, the staple position is 10 mm from the left side and 15 mm from the upper side of the document (output image data).

Since the device servicing layer 140 additionally includes the finish determining service section 142, both the printing filter 135 and the preview image displaying filter 136 can use the finish determining service section 142. That is, the finish determining service section 142 can supply the parameters which are required in the finishing process to both the printing filter 135 and the preview image displaying filter 136. Therefore, a preview image with the finishing process applied can be displayed without a dependence relationship between the printing filter 135 and the preview image displaying filter 136.

Figure 8:
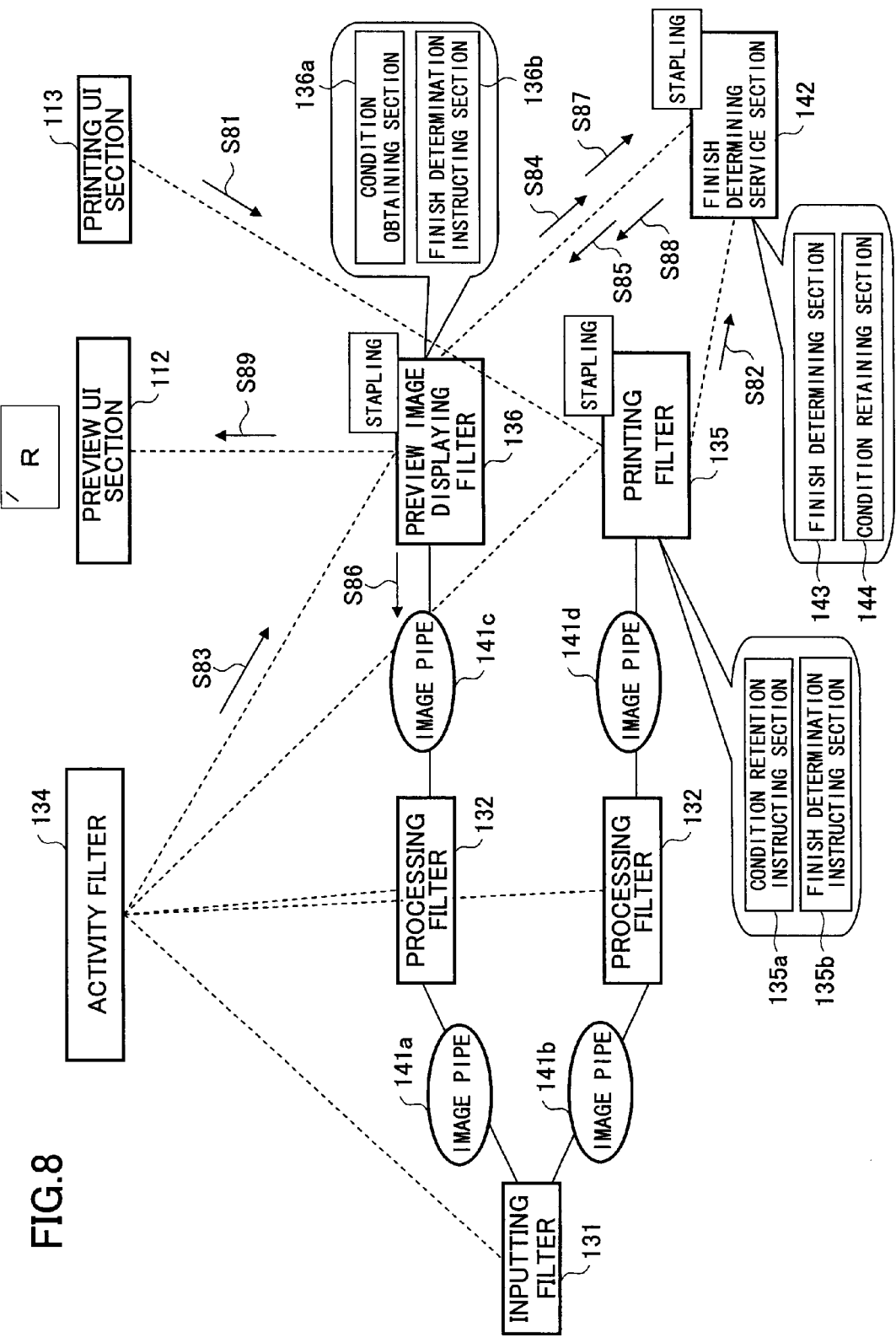
FIG. 8 is a diagram showing a preview image displaying process in which a finishing process is applied to a preview image in the image processing apparatus according to the second embodiment of the present invention.

Next, referring to FIG. 8, a preview image displaying process is described in which a finishing process is applied to a preview image in the image processing apparatus 100A.

FIG. 8 is a diagram showing the preview image displaying process in which the finishing process is applied to a preview image in the image processing apparatus 100A according to the second embodiment of the present invention;

In FIG. 8, similar to in FIG. 5, in order to clearly describe the processes, suffixes are attached to the image pipes 141. However, actually, one image pipe 141 can operate as plural image pipes 141a through 141d. Further, two processing filters 132 are shown in FIG. 5; however, actually, one processing filter 132 applies a predetermined process to image data. In addition, in order to avoid redundant description, some processes described above are omitted.

As shown in FIG. 8, in the image processing apparatus 100A of the second embodiment of the present invention, the finish determining service section 142 includes a finish determining section 143 and a condition retaining section 144. In addition, in the image processing apparatus 100A of the second embodiment of the present invention, the printing filter 135 includes a condition retention instructing section 135a and a finish determination instructing section 135b, and the preview image displaying filter 136 includes a condition obtaining section 136a and a finish determination instructing section 136b.

The finish determining section 143 calculates and determines a parameter for executing the finishing process based on a determined finish processing condition. The condition retaining section 144 retains the determined finish processing conditions. It is possible that the finish processing conditions are temporarily retained.

The condition retention instructing section 135a in the printing filter 135 instructs the finish determining service section 142 to retain a finish processing condition determined for the printing filter 135. The finish determination instructing section 135b in the printing filter 135 instructs the finish determining service section 142 to calculate and determine a parameter for executing the finishing process.

The condition obtaining section 136a in the preview image displaying filter 136 obtains a finish processing condition stored in the condition retaining section 144 in the finish determining service section 142. The finish determination instructing section 136b in the preview image displaying filter 136 instructs the finish determining service section 142 to calculate and determine a parameter for executing the finishing process.

In the image processing apparatus 100A of the present embodiment, by using the elements described above, when a finish processing condition is determined, a preview image of image data to be output can be displayed under the determined finish processing condition.

Next, processes in the image processing apparatus 100A are described.

First, when a user inputs a finish processing condition by using a printing UI (user interface) section 113, the finish processing condition is set in the printing filter 135 (S81). The printing UI section 113 is a user interface where a printing process setting is input and is disposed in the operating section of the image processing apparatus 100A. The setting of the finish processing condition is included in the printing process settings. In addition, a setting input from the printing UI section 113 is set for only the printing filter 135.

In the following, a case is described in which the finish processing is a stapling process and the finish processing condition is a position of a staple.

When the finish processing condition of the position of the staple is set in the printing filter 135, the condition retention instructing section 135a instructs the finish determining service section 142 to retain the finish processing condition in the condition retaining section 144 (S82). As described above, the finish processing condition is the position of the staple on recording media (recording sheets), and is not the precise position calculated and determined by the parameter. For example, the position is an upper left side position.

When the finish processing condition is retained in the finish determining service section 142, the activity filter 134 instructs the preview image displaying filter 136 to execute a preview image displaying process (S83). The preview image displaying filter 136 requests the finish determining service section 142 to send the finish processing condition retained in the condition retaining section 144 in the finish determining service section 142 by using the condition obtaining section 136a (S84).

The finish determining service section 142 sends the finish processing condition to the preview image displaying filter 136 (S85). When the preview image displaying filter 136 obtains the finish processing condition, the preview image displaying filter 136 reads image data for displaying a preview image from the image pipe 141c (S86). The finish determination instructing section 136b in the preview image displaying filter 136 instructs the finish determining service section 142 to determine a parameter for the preview image displaying process by sending information of the read image data, the obtained finish processing condition, and a finish processing determination instruction (S87). The information of the read image data is, for example, the outputting direction and the size of the document.

The finish determining section 143 in the finish determining service section 142 determines a parameter for executing the finishing process based on the information of the read image data and the finish processing condition retained in the condition retaining section 144. Specifically, in the stapling process, a parameter showing the precise position of the staple is determined. The finish determining service section 142 sends the determined parameter to the preview image displaying filter 136 (S88).

When the preview image displaying filter 136 receives the parameter, the preview image displaying filter 136 forms a preview image after executing the finishing process based on the read image data and the parameter, and makes the operating section display the preview image by using the preview UI section 112 (S89).

As described above, in the image processing apparatus 100A of the present embodiment, the preview image to which the finishing process has been applied is displayed.

When the image data of the displayed preview image are determined to be printed, the activity filter 134 instructs the printing filter 135 to execute an image data printing process.

By an instruction from the finish determination instructing section 135b in the printing filter 135, processes similar to the processes in S87 and S88 are executed. That is, the printing filter 135 makes the finish determining service section 142 determine a parameter for the finishing process of the image data and obtains the determined parameter. Then the printing filter 135 executes the image data printing process by using the obtained parameter.

As described above, in the present embodiment, since the finish determining service section 142 is provided in the device servicing layer 140, the finish determining service section 142 can be used in common between the printing filter 135 and the preview image displaying filter 136. With this, the preview image displaying filter 136 can make the operating section display the preview image of the image data after executing the finishing process by using the preview UI section 112.

Figure 9:
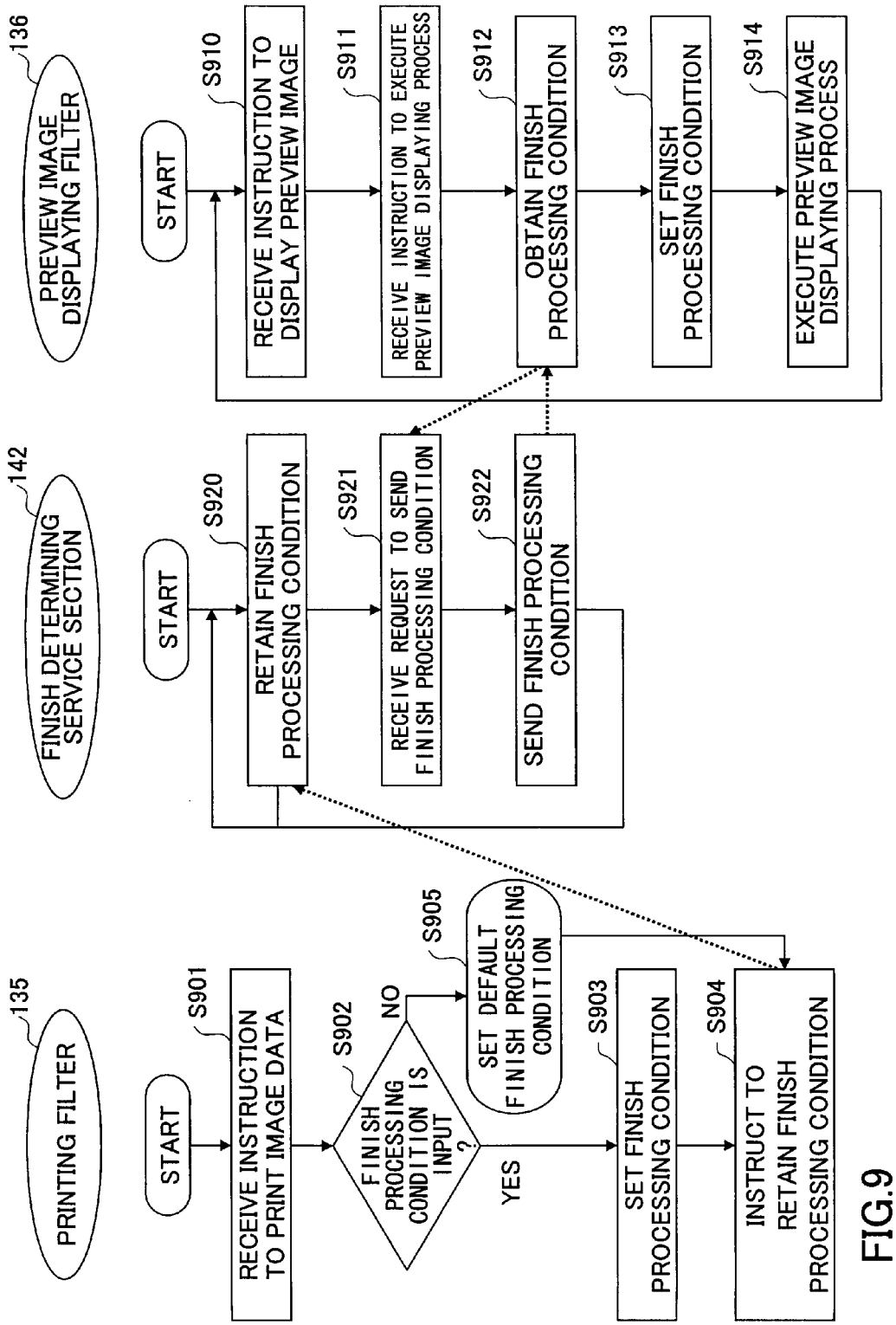
FIG. 9 is a flowchart showing processes for setting the finishing process in the image processing apparatus according to the second embodiment of the present invention.

Next, referring to FIGS. 8 and 9, settings in a finishing process and determination of a parameter in the finishing process of the image processing apparatus 100A, processes in the printing filter 135, the preview image displaying filter 136, and the finish determining service section 142 are described.

FIG. 9 is a flowchart showing processes for setting the finishing process in the image processing apparatus 100A.

First, when a user inputs an instruction to print image data, the printing filter 135 receives the instruction (S901). The printing filter 135 determines whether a finish processing condition is input (S902). When a finish processing condition is input (YES in S902), the finish processing condition is set in the printing filter 135 (S903). The condition retention instructing section 135a instructs the finish determining service section 142 to retain the finish processing condition in the condition retaining section 144 (S904).

When a finish processing condition is not input (NO in S902), a predetermined default finish processing condition is set in the printing filter 135 (S905), and the condition retention instructing section 135a instructs the finish determining service section 142 to retain the default finish processing condition in the condition retaining section 144.

In the image processing apparatus 100A of the present embodiment, even if a finish processing condition is not input, a default finish processing condition is set in the printing filter 135. Therefore, regardless of the presence of the input of a finish processing condition, the printing filter 135 can execute the processes in S901 and S904.

Next, processes in the preview image displaying filter 136 are described for setting a finish processing condition.

When a user inputs an instruction to display a preview image of image data to be output, the preview image displaying filter 136 receives the instruction (S910). Then the preview image displaying filter 136 receives an instruction to execute a preview image displaying process from the activity filter 134 (S911).

The condition obtaining section 136a obtains a finish processing condition from the finish determining service section 142 by using a request (S912). The obtained finish processing condition is set in the preview image displaying filter 136 (S913), and the preview image displaying filter 136 executes the preview image displaying process (S914).

In the image processing apparatus 100A of the present embodiment, the preview image displaying filter 136 obtains a finish processing condition retained in the finish determining service section 142 regardless of the presence of a finish processing condition in the finish determining service section 142. That is, when a finish processing condition is not set in the finish determining service section 142, the preview image displaying filter 136 obtains a default finish processing condition, and executes the preview image displaying process by using the obtained finish processing condition. Therefore, the preview image displaying filter 136 can execute the processes from S912 through S914 regardless of the presence of the setting of the finish processing condition.

Next, processes in the finish determining service section 142 are described in a setting of a finish processing condition.

The finish determining service section 142 receives an instruction to retain a finish processing condition from the printing filter 135, and retains the finish processing condition in the condition retaining section 144 (S920). When the finish determining service section 142 receives a request to send a finish processing condition to the preview image displaying filter 136 (S921), the finish determining service section 142 sends the requested finish processing condition to the preview image displaying filter 136 (S922).

As described above, in the image processing apparatus 100A of the present embodiment, the finish determining service section 142 receives an instruction to retain a finish processing condition, and retains the finish processing condition in the condition retaining section 144. In addition, the finish determining service section 142 receives a request to send the finish processing condition and sends the retained finish processing condition. Therefore, a dependence relationship does not exist among the finish determining service section 142, the printing filter 135, and the preview image displaying filter 136. Consequently, the finish determining service section 142 can receive and send a finish processing condition without a change in one filter influencing the other filter.

As described above, in the image processing apparatus 100A of the present embodiment, a finish processing condition is input to the printing filter 135 and is set in the printing filter 135, the finish processing condition is retained in the finish determining service section 142, and the finish processing condition is set in the preview image displaying filter 136.

As described above, in the image processing apparatus 100A of the present invention, since a dependence relationship does not exist between the printing filter 135 and the preview image displaying filter 136, the filters 135 and 136 can obtain the same finish processing condition. Therefore, even if the function of one filter is changed, the finish processing condition can be set in both the filters 135 and 136 without the change influencing the other filter. Consequently, the functions of the filters 135 and 136 can be easily expanded and customized.

Figure 10:
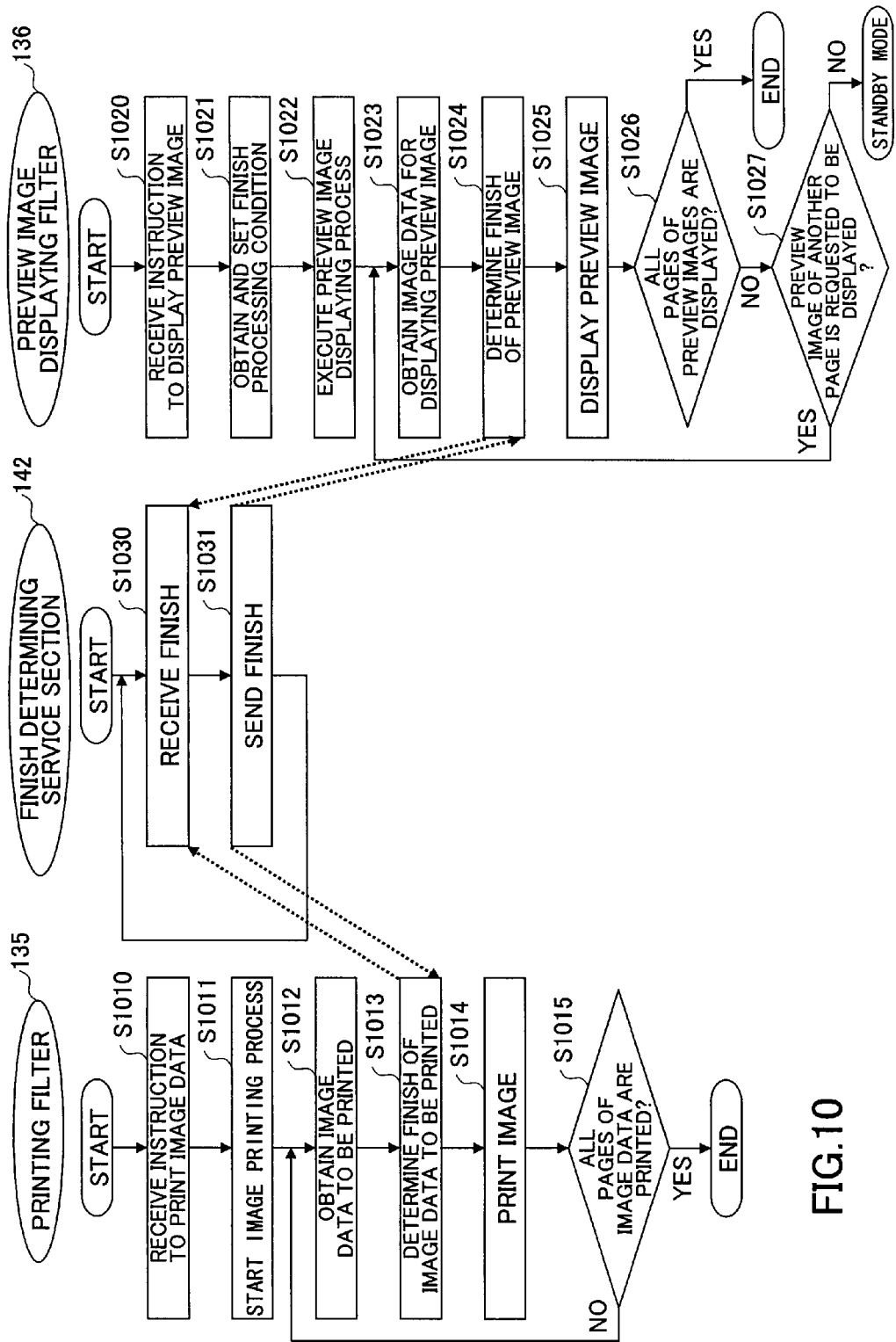
FIG. 10 is a flowchart showing processes for determining a parameter in the finishing process in the image processing apparatus according to the second embodiment of the present invention.

Next, referring to FIGS. 8 and 10, processes are described in which a parameter in a finishing process is determined in the image processing apparatus 100A according to the second embodiment of the present invention. FIG. 10 is a flowchart showing processes for determining a parameter in a finishing process in the image processing apparatus 100A according to the second embodiment of the present invention.

First, processes in the printing filter 135 are described in a parameter determining process based on a finish processing condition.

The printing filter 135 receives an instruction to output (print) image data from the activity filter 134 (S1010), and starts an image outputting process (image printing process) (S1011).

The printing filter 135 obtains image data to be output (printed) from the image pipe 141d (S1012). The printing filter 135 sends information of the obtained image data, a finish processing condition, and an instruction from the finish determination instructing section 135b to the finish determining service section 142. The information of the read image data is, for example, the outputting direction and the size of the document.

The printing filter 135 obtains a parameter for executing a finishing process which parameter is calculated and determined by the finish determining service section 142, and determines the finish of the image data to be output (S1013). The printing filter 135 executes a printing process of the obtained image data by using the parameter (S1014). That is, the printing filter 135 makes the plotter section 152 (refer to FIG. 7) print the image data on recording media (recording sheets). Then the printing filter 135 determines whether all pages of the image data are output (S1015). When all pages of the image data are output (YES in S1015), the printing process ends.

As described above, after the finish processing condition is set, the printing filter 135 obtains a parameter determined by the finish determining service section 142 regardless of the presence of the preview image displaying filter 136, and executes the printing process of the image data and the finishing process is applied to the printed document. Therefore, in the printing process of the image data under the finish processing condition, since a dependence relationship does not exist between the printing filter 135 and the preview image displaying filter 136, the preview image displaying filter 136 can be deleted or the preview image displaying filter 135 can be added again after the deletion.

Next, processes in the preview image displaying filter 136 in a parameter determining process based on a finish processing condition are described.

In the processes of the preview image displaying filter 136, processes from S1020 through S1022 shown in FIG. 10 are the same as the processes from S911 through S914 shown in FIG. 9. That is, the preview image displaying filter 136 receives an instruction to display a preview image of image data to be output (S1020). Then the preview image displaying filter 136 receives an instruction to execute a preview image displaying process from the activity filter 134, the condition obtaining section 136a obtains a finish processing condition from the finish determining service section 142, and sets the obtained finish processing condition in the preview image displaying filter 136 (S1021). Then the preview image displaying filter 136 executes the preview image displaying process (S1022). In FIG. 10, the processes for obtaining the finish processing condition from the finish determining service section 142 are omitted.

When the preview image displaying filter 136 starts to execute the preview image displaying process under the finish processing condition, the preview image displaying filter 136 obtains image data for displaying a preview image from the image pipe 141c (S1023). The preview image displaying filter 136 sends information of the obtained image data, the finish processing condition, and an instruction from the finish determination instructing section 136b to the finish determining service section 142. The information of the obtained image data is, for example, the outputting direction and the size of the document to be read.

The preview image displaying filter 136 obtains a parameter for executing a finishing process which parameter is calculated and determined by the finish determining service section 142, and determines the finish of the preview image (S1024). The preview image displaying filter 136 executes the preview image displaying process of the obtained image data by using the parameter (S1025). That is, the preview image displaying filter 136 makes the operating section display the preview image. Then the preview image displaying filter 136 determines whether all pages of the preview images are displayed (S1026). When all pages of the preview images are displayed (YES in S1026), the preview image displaying process ends.

When all pages of the preview images are not displayed (NO in S1026), the preview image displaying filter 136 determines whether a preview image of another page is requested to be displayed (S1027). When a preview image of another page is requested to be displayed (YES in S1027), the preview image displaying filter 136 repeats the processes from S1023 through S1026. When a preview image of another page is not requested to be displayed (NO in S1027), the preview image displaying filter 136 ends the preview image displaying process and enters a standby mode.

As described above, in the preview image displaying process under the finish processing condition, a dependence relationship does not exists between the preview image displaying filter 136 and the printing filter 135. Therefore, in the image processing apparatus 100A of the present embodiment, the function of the printing filter 135 can be freely customized and expanded regardless of the presence of the preview image displaying filter 136.

Next, processes in the finish determining service section 142 are described in a parameter determining process based on a finish processing condition.

When the finish determining service section 142 receives the information of the image data, the finish processing condition, and the instruction from the finish determination instructing section 135b from the printing filter 135 (S1030), the finish determining service section 142 calculates and determines a parameter for executing the finishing process, and sends the parameter to the printing filter 135 (S1031).

Similarly, when the finish determining service section 142 receives the information of the image data, the finish processing condition, and the instruction from the finish determination instructing section 136b, from the preview image displaying filter 136 (S1030), the finish determining service section 142 calculates and determines a parameter for executing the finishing process, and sends the parameter to the preview image displaying filter 136 (S1031).

As described above, in the image processing apparatus 100A of the present embodiment, a dependence relationship does not exist among the finish determining service section 142, the printing filter 135, and the preview image displaying filter 136. Therefore, even if the function of one of the filters is changed, the finish determining service section 142 can determine a parameter for determining finish of image data (and a preview image) without the change influencing the other filter.

Consequently, in the image processing apparatus 100A of the present embodiment, the functions of the filters can be easily expanded or customized.

Next, the operating section of the image processing apparatus 100A is described. FIG. 11A is a diagram showing an operating section 200 of a conventional image processing apparatus. FIG. 11B is a diagram showing an operating section 300 of the image processing apparatus 100A according to the second embodiment of the present invention.

First, the operating section 200 of the conventional image processing apparatus is described. The operating section 200 is formed of a member having a displaying function, for example, an operating panel.

The operating section 200 independently provides a process setting screen and a finish setting screen. On the process setting screen, a process for image data in a printing process is set. On the finish setting screen, a finish processing condition in an image outputting process of image data is set. As shown in FIG. 11A, on the process setting screen, settings such as rotation, scaling, density of an image including in an image process which is executed by a processing filter are set. On the operating section 200, when a preview image of image data to which a setting is applied on the process setting screen is displayed, a preview button 210 is pushed. When the preview button 210 is pushed, the process setting screen is changed to a preview image displaying screen on the operating section 200. Then a preview image to which the setting has been applied on the process setting screen is displayed on the preview image displaying screen.

When the setting is changed on the preview image displaying screen, a process setting button 220 is pushed. Then the preview image displaying screen is changed to the process setting screen again, and a new setting is executed again.

Similarly, a finish processing condition is set on the finish setting screen. That is, when a preview image of image data under a finish processing condition which is set on the finish setting screen is displayed on the preview image displaying screen, the finish setting screen is changed to the preview image displaying screen on the operating section 200 by pushing the preview button 210.

As described above, the operating section 200 of the conventional image processing apparatus independently provides the process setting screen, the preview image displaying screen, and the finish setting screen. Consequently, when a user confirms the settings, the user must change a screen to another screen. That is, the user must execute complex processes. In addition, on the operating section 200 of the conventional image processing apparatus, since a setting cannot be executed while displaying a preview image, the user must memorize the settings displayed on the process setting screen and the finish processing condition displayed on the finish setting screen; that is, the operability of the operating section 200 is low.

In order to solve the above problems, the image processing apparatus 100A of the present embodiment includes a process setting region, a finish processing condition setting region, and a preview image displaying region on a screen of the operating section 300.

Next, referring to FIG. 11B, the operating section 300 of the image processing apparatus 100A of the present embodiment is described. The operating section 300 is formed of a member having a displaying function, for example, an operating panel.

As shown in FIG. 11B, on the operating section 300 of the image processing apparatus 10A, a process setting region 310 (first operating region), a finish processing condition setting region 320 (second operating region), and a preview image displaying region 330 (third operating region) are simultaneously displayed on the screen. A process setting for image data is determined on the process setting region 310, a finish processing condition is determined on the finish processing condition setting region 320, and a preview image to which the process setting and the finish processing condition have been applied is displayed on the preview image displaying region 330.

On a preview image displaying screen of the operating section 300, for example, when a punch button displayed in the finish processing condition setting region 320 is pushed, a preview image displayed in the preview image displaying region is changed to a preview image to which a punching process (finishing process) has been applied.

As described above, on the operating section 300 of the image processing apparatus 100A, a preview image displayed on the preview image displaying screen can be changed to a new preview image to which a setting and a condition have been applied without changing the preview image displaying screen. Consequently, processes for the settings are simplified and the operability on the operating section 300 can be high.

Third Embodiment

Next, referring to the drawings, a third embodiment of the present invention is described. In the third embodiment of the present invention, the image processing apparatus 100A is also used. However, the functions of the image processing apparatus 100A of the third embodiment of the present invention are slightly different from those of the second embodiment of the present invention. That is, the image processing apparatus 100A of the third embodiment of the present invention includes a preview image displaying filter 136A. The functions of the other elements in the third embodiment of the present invention are almost the same as those in the second embodiment of the present invention, and some elements have additional functions compared with the second embodiment; however, the some elements have the corresponding same reference numbers as those of the second embodiment. In the third embodiment of the present invention, points different from the second embodiment of the present invention which points include the preview image displaying filter 136A are mainly described.

In the second embodiment of the present invention, the preview image displaying filter 136 makes the operating section display the preview image of the image data read from the image pipe 141c to which preview image the finishing process has been applied based on the parameter determined by the finish determining service section 142. That is, in the second embodiment of the present invention, the preview image displaying filter 136 dynamically forms the preview image data. That is, the preview image displaying filter 136 forms the preview image under the finish processing condition by using the finish processing condition and the determined parameter.

In the second embodiment of the present invention, when a new finish processing condition is added, the preview image displaying filter 136 must change the preview image by including the new finish processing condition.

That is, in the second embodiment of the present invention, when a new finish processing condition is added, the source code of the preview image displaying filter 136 must be rewritten.

In other words, in the second embodiment of the present invention, when a new finish processing condition is added or an existing finish processing condition is changed, a preview image is not easily displayed.

In the third embodiment of the present invention, when a new finish processing condition is added or an existing finish processing condition is changed, a preview image is easily displayed.

The preview image displaying filter 136A of the third embodiment of the present invention makes the operating section display a preview image of image data in which image data read from the image pipe 141c are synthesized with synthesizing image data (described below) based on a finish processing condition retained in the condition retaining section 144.

Next, referring to FIG. 12, the preview image displaying filter 136A is described. FIG. 12 is a diagram showing a structure of the preview image displaying filter 136A and processes performed by the preview image displaying filter 136A.

As shown in FIG. 12, the preview image displaying filter 136A includes a searching section 136c and an image data synthesis instructing section 136d in addition to including the condition obtaining section 136a and the finish determination instructing section 136b. The searching section 136c searches for a file name of synthesizing image data corresponding to a finish processing condition from a finish processing condition table 250 (described below). The image data synthesis instructing section 136d instructs an image data synthesis processing section 170 (described below) to synthesize image data read from the image pipe 141c with the synthesizing image data.

The image processing apparatus 100A of the third embodiment of the present invention further includes the finish processing condition table 250, the image data synthesis processing section 170, and a synthesizing image data database 251. The finish processing condition table 250 and the synthesizing image data database 251 are stored in a storage unit, for example, an HD (hard disk) of the image processing apparatus 100A.

The finish processing condition table 250 stores the finish processing conditions and the corresponding file names of the synthesizing image data. The file name is information to identify synthesizing image data corresponding to a finish processing condition. The synthesizing image data database 251 stores the synthesizing image data. The synthesizing image data are image data of an icon corresponding to a finish processing condition. The icons are, for example, an icon of a staple showing a stapling process, and an icon of a punch hole showing a punching process.

Next, referring to FIG. 12, the processes of the preview image displaying filter 136A are described. In FIG. 12, the processes after the process of S88 shown in FIG. 8 are described. That is, the preview image displaying filter 136A has obtained the image data from the image pipe 141c and the parameter for executing the finishing process determined by the finish determining service section 142. In other words, the preview image displaying filter 136A has obtained the finish processing condition (S121).

The searching section 136c of the preview image displaying filter 136A searches for a file name in the finish processing condition table 250 by using the obtained finish processing condition as a key (S122). The preview image displaying filter 136A obtains a file name of synthesizing image data corresponding to the obtained finish processing condition (S123).

For example, in FIG. 12, "Staple=ON" and "Upper Left Side=ON" (Stapling at Upper Left Side) are set in the obtained finish processing condition. Therefore, the preview image displaying filter 136A searches for a file name in the finish processing condition table 250 by using "Staple=ON" and "Upper Left Side=ON" as the key, and obtains a corresponding file name "Staple_Reft_Up.jpg".

When a file name of synthesizing image data corresponding to the obtained finish processing condition is not obtained, the preview image displaying filter 136A makes the operating section display the preview image of the image data read from the image pipe 141c as they are.

When the preview image displaying filter 136A obtains the file name, the image data synthesis instructing section 136d instructs the image data synthesis processing section 170 to synthesize the image data read from the image pipe 141c with the synthesizing image data corresponding to the obtained file name (S124). At this time, the preview image displaying filter 136A sends the file name of the synthesizing image data, the image data read from the image pipe 141c, and the parameter obtained from the finish determining service section 142 to the image data synthesis processing section 170.

Then the image data synthesis processing section 170 synthesizes the image data read from the image pipe 141c with the synthesizing image data (icon) corresponding to the obtained file name.

Specifically, when the image data synthesis processing section 170 obtains the file name, the image data synthesis processing section 170 refers to the synthesizing image data database 251 (S125), and obtains synthesizing image data corresponding to the obtained file name from the synthesizing image data database 251 (S126). When the image data synthesis processing section 170 cannot obtain the synthesizing image data corresponding to the obtained file name, it is possible that an error message is displayed on the operating section.

The image data synthesis processing section 170 synthesizes the obtained synthesizing image data at the position designated by the parameter sent from the preview image displaying filter 136A on the image data read from the image pipe 141c. The image data synthesis processing section 170 sends the synthesized image data to the preview image displaying filter 136A. The preview image displaying filter 136A makes the operating section display the synthesized image data as the preview image.

In an example shown in FIG. 12, the image data synthesis processing section 170 obtains the file name "Staple_Reft_Up.jpg". Therefore, the image data synthesis processing section 170 searches for synthesizing image data corresponding to the obtained file name in the synthesizing image data database 251 and obtains synthesizing image data 171. In this case, the synthesizing image data 171 is an icon showing a stapling process. The image data synthesis processing section 170 synthesizes the synthesizing image data 171 with image data 172 read from the image pipe 141c, and forms synthesized image data 173.

The synthesized image data 173 are sent to the preview image displaying filter 136A. The preview image displaying filter 136A makes the operating section display the synthesized image data 173. It is possible that the image data synthesis processing section 170 is realized by installing a program having the synthesizing process in an ASIC (application specific integrated circuit).

As described above, the preview image displaying filter 136A can make the operating section display a preview image without dynamically forming the preview image. That is, the preview image displaying filter 136A only executes processes in which a file name of synthesizing image data is obtained from the finish processing condition table 250 and the obtained file name is sent to the image data synthesis processing section 170.

Therefore, the preview image displaying filter 136A can make the operating section display the preview image by using the finish processing condition table 250, the synthesizing image data database 251, and the image data synthesis processing section 170. Consequently, in the present embodiment, even if a new finish processing condition is added or an existing finish processing condition is changed, the preview image can be easily displayed.

In the third embodiment of the present invention, the finish processing condition table 250 and the synthesizing image data database 251 are stored in the HD. However, the finish processing condition table 250 and the synthesizing image data database 251 can be stored in an external storage unit as general purpose files. At this time, when a new finish processing condition is added, the finish processing condition table 250 and the synthesizing image data database 251 are simultaneously updated by including the new finish processing condition and the corresponding icon. Therefore, when the new finish processing condition is added, a preview image corresponding to the added new finish processing condition can be easily displayed without changing the preview image displaying filter 136A.

Figure 13:
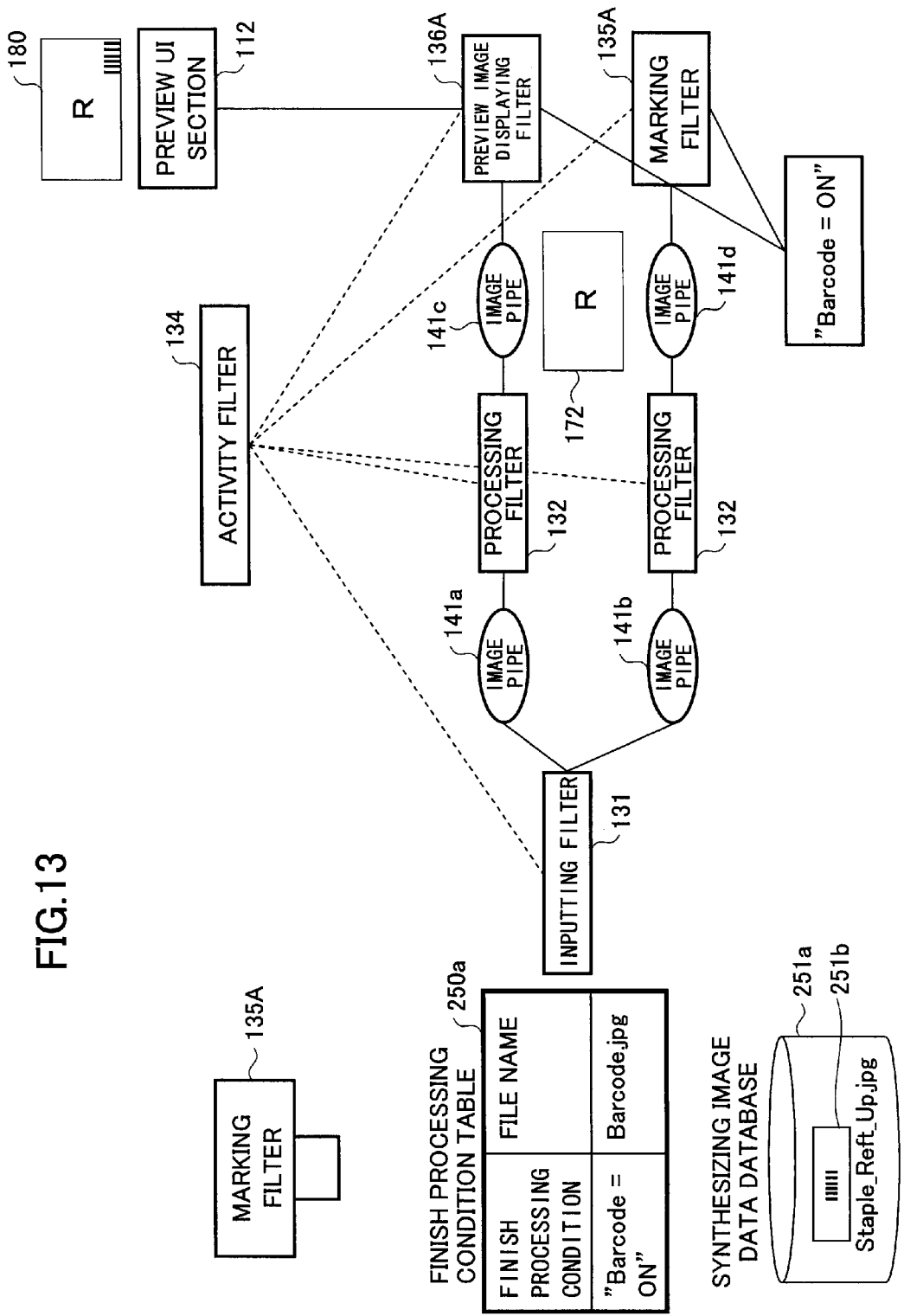
FIG. 13 is a diagram showing processes in a case in which a new finish processing condition is added to the image processing apparatus according to the third embodiment of the present invention.

Next, referring to FIG. 13, processes in a case are described in which a new finish processing condition is added to the image processing apparatus 10A. FIG. 13 is a diagram showing processes in a case in which a new finish processing condition is added to the image processing apparatus 100A according to the third embodiment of the present invention.

In FIG. 13, a case is shown in which a marking filter 135A is added to the image processing apparatus 100A as the new finish processing condition. By using the marking filter 135A, a document is printed by attaching a predetermined barcode to the document.

In this case, when the marking filter 135A is added, another finish processing condition table 250a and another synthesizing image data database 251a corresponding to the marking filter 135A are simultaneously added.

First, when a user instructs to display a preview image of image data by using the preview UI section 112, the preview image displaying filter 136A obtains a finish processing condition set by the marking filter 135A and obtains synthesizing image data (icon of the finish processing condition).

Specifically, the preview image displaying filter 136A searches for a file name in the finish processing condition table 250a by using a finish processing condition "Barcode=ON" of the marking filter 135A as a key, and obtains a file name "Barcode.jpg" of the synthesizing image data. The preview image displaying filter 136A sends the file name "Barcode.jpg" to the image data synthesis processing section 170 (refer to FIG. 12). The image data synthesis processing section 170 synthesizes synthesizing image data 251b corresponding to the file name "Barcode.jpg" obtained from the synthesizing image data database 251a with the image data 172 (refer to FIG. 12) read from the image pipe 141c, and outputs the synthesized image data to the preview image displaying filter 136A.

The preview image displaying filter 136A makes the operating section display a preview image 180 including the synthesizing image data.

As described above, even if a new finish processing condition is added, a preview image can be easily displayed without changing the preview image displaying filter 136A.

Next, a case is described in which synthesizing image data of a finish processing condition are changed by, for example, customization.

In this case, when a finish processing condition including synthesizing image data is changed, a preview image under the changed finish processing condition can be displayed by only rewriting the finish processing condition table and the synthesizing image data database.

Figure 14:
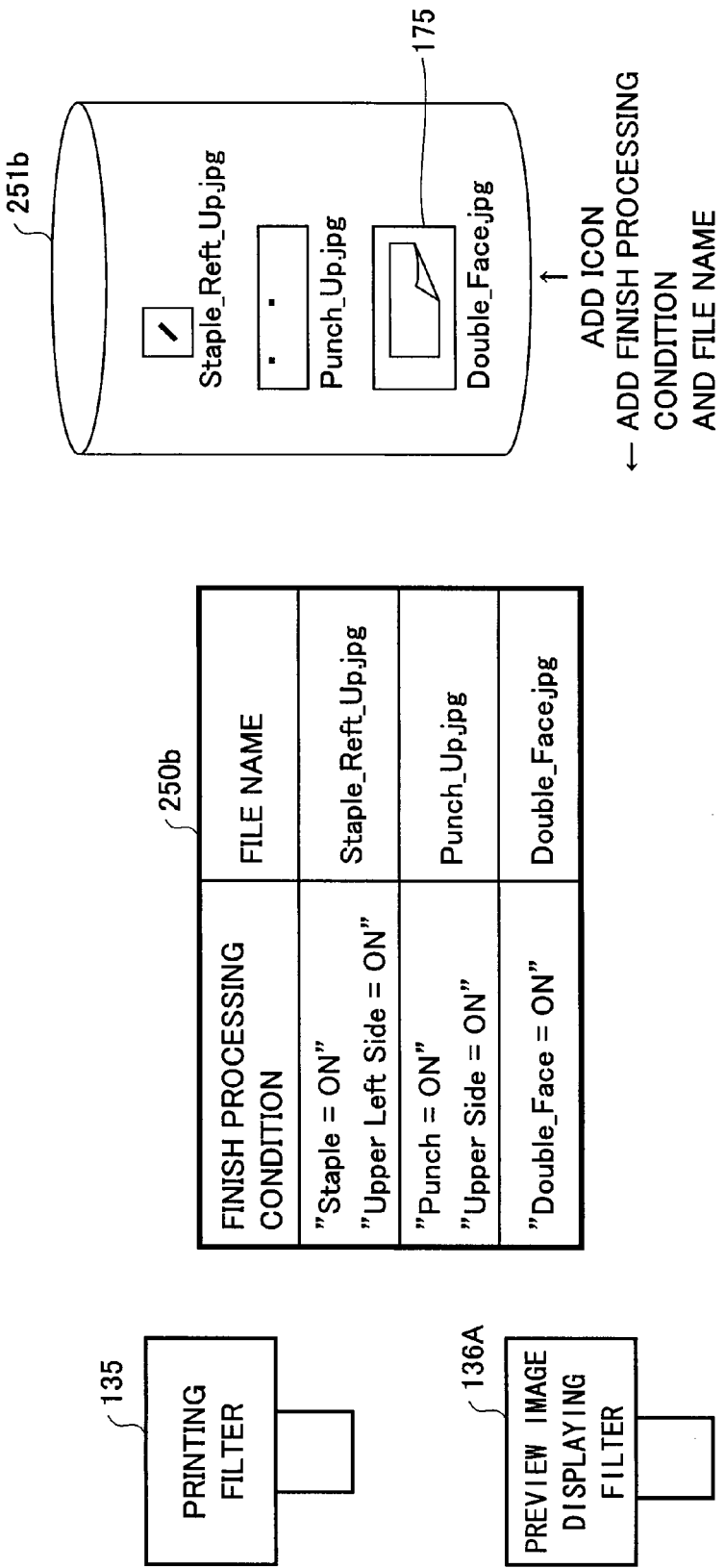
FIG. 14 is a diagram showing processes when a finish processing condition is changed in the image processing apparatus according to the third embodiment of the present invention.

FIG. 14 is a diagram showing processes when a finish processing condition is added to the printing filter 135. In FIG. 14, a case is shown in which a finish processing condition "Double_Face" is added to the finish processing conditions of the printing filter 135. The finish processing condition "Double_Face" signifies that image data are printed on both sides of a recording medium.

In this case, synthesizing image data 175 showing an icon of the finish processing condition "Double_Face=ON" are added to a synthesizing image data database 251b. In addition, the file name "Double_Face.jpg" corresponding to the finish processing condition "Double-Face=ON" is added to a finish processing condition table 250b.

As described above, in the present embodiment, when a new finish processing condition is added in an outputting filter, the new finish processing condition table 250b and the new synthesizing image data database 251b are formed. That is, a preview image under the new finish processing condition can be displayed without changing the preview image displaying filter 136A.

Figure 15:
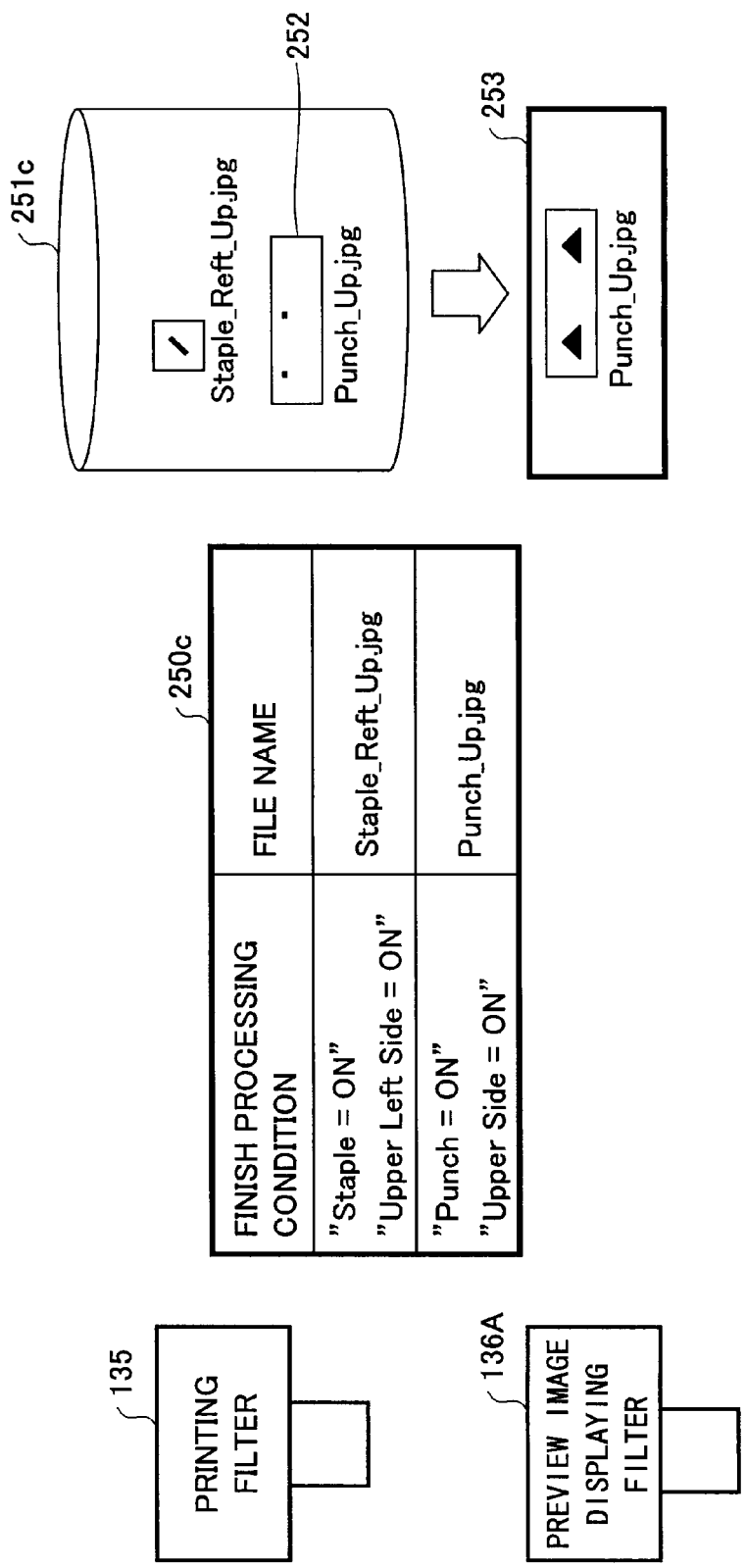
FIG. 15 is a diagram showing processes when synthesizing image data stored in a synthesizing image data database are revised according to the third embodiment of the present invention.

In addition, in the present embodiment, when synthesizing image data stored in the synthesizing image data database 251 are revised, a preview image can be revised. FIG. 15 is a diagram showing processes when synthesizing image data stored in a synthesizing image data database are revised.

In FIG. 15, a case is shown in which synthesizing image data 252 corresponding to a punching process in a synthesizing image data database 251c are revised to synthesizing image data 253.

In this case, when only the synthesizing image data 252 are revised to the synthesizing image data 253 in the synthesizing image data database 251c, the synthesizing image data 253 (new icon) can be displayed in the preview image. At this time, the file name in a finish processing condition table 250c is not revised. That is, the file name of the synthesizing image data 253 is the same as that of the synthesizing image data 252.

The processes described in the first through third embodiments of the present invention can be recorded in a computer-readable recording medium as an image processing program.

Figure 16:
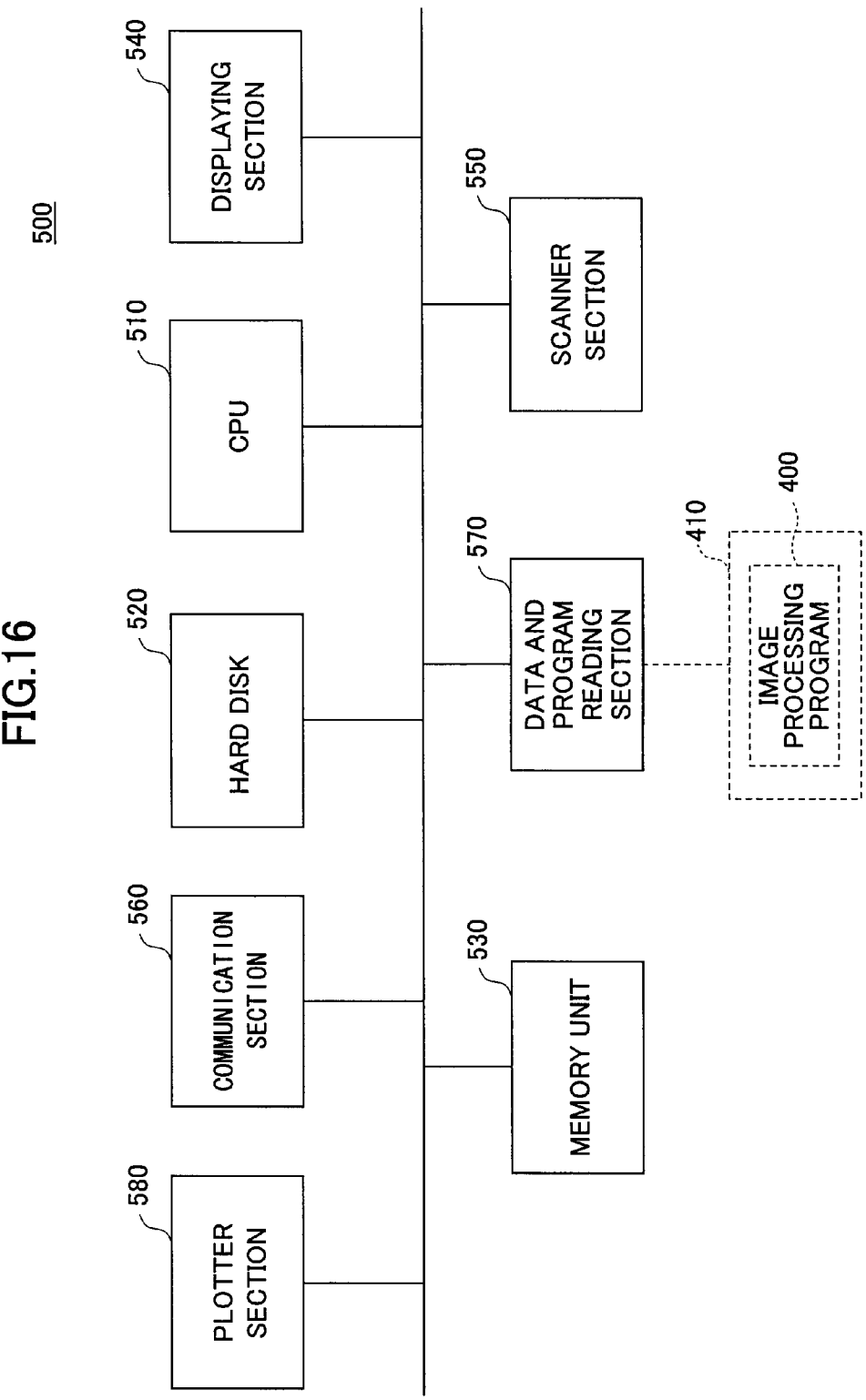
FIG. 16 is a diagram showing a structure of an image processing apparatus according to the embodiments of the present invention.

FIG. 16 is a diagram showing a structure of an image processing apparatus 500. The image processing apparatus 500 can be the image processing apparatus 100 and the image processing apparatus 10A. The image processing apparatus 500 includes a recording medium 410, and the recording medium 410 stores the image processing program for executing the processes described in the first through third embodiments of the present invention.

As shown in FIG. 16, the image processing apparatus 500 includes a CPU 510, a hard disk 520, a memory unit 530, a displaying section 540, a scanner section 550, a communication section 560, a data and program reading section 570, and a plotter section 580. The CPU 510 executes operations and processes in the image processing apparatus 500. The hard disk 520 stores application software to be executed by the CPU 510, data processed by the application software, and other data. The memory unit 530 stores predetermined setting values which are used in the processes in the image processing apparatus 500, results of operations by the CPU 510, and so on.

The displaying section 540 displays operating conditions of the image processing apparatus 500 and so on. In addition, a user instructs performing a process in the image processing apparatus 500 by using the displaying section 540. The scanner section 550 includes a scanner and an engine for controlling the scanner, converts a document into image data by scanning the document, and inputs the converted data to the image processing apparatus 500. The communication section 560 is, for example, a network control unit, and the image processing apparatus 500 communicates with an external device by using the communication section 560. The data and program reading section 570 reads data and a program stored in a recording medium. The data and program reading section 570 is, for example, a floppy disk drive. The plotter section 580 includes a plotter and an engine for controlling the plotter, and outputs image data on, for example, a recording sheet.

The recording medium 410 stores an image processing program 400 for executing the processes described in the first through third embodiments of the present invention. The image processing program 400 is read by the data and program reading section 570, and the CPU 510 executes the image processing program. The recording medium 410 is, for example, a memory card or a floppy disk, or can be a recording medium readable by the image processing apparatus 500. In addition, the image processing program 400 can be received by the communication section 560 from an external device via a network, and can be stored in the hard disk 520.

Further, the present invention is not limited to the specifically disclosed embodiments, and variations and modifications may be made without departing from the scope of the present invention.

The present invention is based on Japanese Priority Patent Application No. 2007-057882, filed on Mar. 7, 2007, and Japanese Priority Patent Application No. 2007-260173, filed on Oct. 3, 2007, with the Japanese Patent Office, the entire contents of which are hereby incorporated herein by reference.

What is claimed is:

1. An image processing apparatus, comprising:
an inputting section to which image data to be processed are input;
an inputting filter which controls an inputting process of the image data input to the inputting section;
an outputting section from which the processed image data are output;
a first outputting filter which controls an outputting process of the image data to be output from the outputting section;
a processing filter which controls an image data processing process of the input image data by being connected between the inputting filter and the first outputting filter;
a second outputting filter which controls an outputting process of a preview image of the image data to be output from the outputting section;
a finish determining section which determines a parameter in a finishing process for the image data to be output from the first outputting filter;
a condition retaining section which retains finish processing conditions in the finishing process, wherein
the first outputting filter includes
a condition retention instructing section which instructs the condition retaining section to retain the finish processing condition,
a finish determination instructing section which instructs the finish determining section to determine the parameter based on the finish processing condition, and
the first outputting filter controls the outputting process of the image data by using the parameter determined by the finish determining section;
the second outputting filter includes
a condition obtaining section which obtains the finish processing condition from the condition retaining section,
a finish determination instructing section which instructs the finish determining section to determine the parameter based on the finish processing condition, and
the second outputting filter controls the outputting process of the preview image of image data in which synthesizing image data corresponding to the finish processing condition are synthesized with the image data output from the outputting section by using the parameter determined by the finish determining section;
a storage device that stores a finish processing condition table in which the finish processing condition and a file name of the synthesizing image data corresponding to the finish processing condition are stored;

a database in which the synthesizing image data corresponding to the finish processing condition is stored; and
an image data synthesis processing section which synthesizes the preview image output from the second outputting filter with the synthesizing image data from the database, wherein
 a searching section, included in the second outputting filter, searches for the file name of the synthesizing image data corresponding to the finish processing condition in the finish processing condition table by using the finish processing condition obtained by the condition obtaining section,
 the image data synthesis processing section searches the database for the synthesizing image data corresponding to the file name of the synthesizing image data and obtains the synthesizing image data, and
 an image data synthesis instructing section, included in the second outputting filter, instructs the image data synthesis processing section to synthesize the synthesizing image data identified by the file name corresponding to the finish processing condition with the preview image output by the second outputting filter; wherein
the inputting filter generates first image data for the image data to be output from the first outputting filter and second image data for the preview image to be output from the second outputting filter in the inputting process, and the resolution of the second image data is lower than the resolution of the first image data, and
when an instruction to display the preview image of the image data to be output from the outputting section is received, the second outputting filter is connected to the processing filter.

2. The image processing apparatus as claimed in claim 1, wherein:
data format of the first image data is the same as data format of the second image data.

3. The image processing apparatus as claimed in claim 1, wherein:
the second outputting filter includes
a condition obtaining section which obtains the finish processing condition from the condition retaining section;
a finish determination instructing section which instructs the finish determining section to determine the parameter based on the finish processing condition; and
the second outputting filter controls the outputting process of the preview image of the image data to be output from the first outputting filter by using the parameter determined by the finish determining section.

4. The image processing apparatus as claimed in claim 1, further comprising:
a finish determining service section, wherein
the finish determining service section includes the finish determining section and the condition retaining section.

5. The image processing apparatus as claimed in claim 1, further comprising:
an operating section on which a user operates the image processing apparatus and operating conditions of the image processing apparatus are displayed; wherein
the operating section includes
a first operating region on which a process setting for the image data by the processing filter is determined;
a second operating region on which the finish processing condition in the finish processing is determined; and
a third operating region on which a preview image to which the process setting and the finish processing condition have been applied is displayed by the second outputting filter.

6. An image processing method of an image processing apparatus having an image data inputting section and an image data outputting section, comprising:
an inputting step of inputting image data to be processed by the image processing apparatus to the image data inputting section;
an image data input controlling step of controlling an inputting process of the image data input to the image data inputting section by an inputting filter;
a first image data processing step of processing the image data input to the image data inputting section via the inputting filter by a processing filter;
a first image data output controlling step of controlling an outputting process of the image data to be output from the image data outputting section by a first outputting filter;
a second image data processing step of processing the image data input to the image data inputting section via the inputting filter by the processing filter for forming a preview image of the image data to be output from the image data outputting section;
a second image data output controlling step of controlling an outputting process of the preview image of the image data to be output from the image data outputting section by a second outputting filter;
a generating step of generating, by the inputting filter, first image data for the image data to be output from the first outputting filter and second image data for the preview image to be output from the second outputting filter in the inputting process, and the resolution of the second image data is lower than the resolution of the first image data;
a finish determining step of determining a parameter in a finishing process for the image data to be output from the first outputting filter;
a condition retaining step of retaining a finish processing condition for the finishing process;
a condition retention instructing step by the first outputting filter of retaining the finish processing condition;
a finish determination instructing step by the first outputting filter of instructing to determine the parameter based on the finish processing condition;
a controlling step by the first outputting filter of controlling the outputting process of the image data by using the determined parameter;
a condition obtaining step by the second outputting filter of obtaining the finish processing condition;
a finish determination instructing step by the second outputting filter of instructing to determine the parameter based on the finish processing condition;
a controlling step by the second outputting filter of outputting the preview image of the image data to be output from the first outputting filter by using the determined parameter;
a controlling step by the second outputting filter of controlling the outputting process of the preview image of image data in which synthesizing image data to be synthesized corresponding to the finish processing condition are synthesized with the image data to be output from the outputting section by using the determined parameter;
a finish processing condition table forming step of forming a finish processing condition table in which the finish processing condition and a file name of the synthesizing image data corresponding to the finish processing condition are stored;

a database forming step of forming a database in which the synthesizing image data corresponding to the finish processing condition is stored;

an image data synthesis processing step of synthesizing the image data obtained from the preview image output from the second outputting filter with the synthesizing image data obtained from the database;

a searching step by the second outputting filter of searching for the file name of the synthesizing image data corresponding to the finish processing condition in the finish processing condition table by using the obtained finish processing condition;

a searching step of searching the database for the synthesizing image data corresponding to the file name of the synthesizing image data and obtaining the synthesizing image data; and an image data synthesis instructing step by the second outputting filter of instructing to synthesize the synthesizing image data identified by the file name corresponding to the finish processing condition with the preview image output by the second outputting filter, wherein when an instruction to display the preview image of the image data to be output from the image data outputting section is received, the second image data processing step and the second image data output controlling step are executed.

7. A non-transitory computer-readable recording medium storing an image processing program in an image processing apparatus having an image data inputting section and an image data outputting section, the image processing program causing the image processing apparatus to execute a method comprising:

an inputting step of inputting image data to be processed by the image processing apparatus to the image data inputting section;

an image data input controlling step of controlling an inputting process of the image data input to the image data inputting section by an inputting filter;

a first image data processing step of processing the image data input to the image data inputting section via the inputting filter by a processing filter;

a first image data output controlling step of controlling an outputting process of the image data to be output from the image data outputting section by a first outputting filter;

a second image data processing step of processing the image data input to the image data inputting section via the inputting filter by the processing filter for forming a preview image of the image data to be output from the image data outputting section;

a second image data output controlling step of controlling an outputting process of the preview image of the image data to be output from the image data outputting section by a second outputting filter;

a generating step of generating, by the inputting filter, first image data for the image data to be output from the first outputting filter and second image data for the preview image to be output from the second outputting filter in the inputting process, and the resolution of the second image data is lower than the resolution of the first image data;

a finish determining step of determining a parameter in a finishing process for the image data to be output from the first outputting filter;

a condition retaining step of retaining a finish processing condition for the finishing process;

a condition retention instructing step by the first outputting filter of retaining the finish processing condition;

a finish determination instructing step by the first outputting filter of instructing to determine the parameter based on the finish processing condition;

a controlling step by the first outputting filter of controlling the outputting process of the image data by using the determined parameter;

a condition obtaining step by the second outputting filter of obtaining the finish processing condition;

a finish determination instructing step by the second outputting filter of instructing to determine the parameter based on the finish processing condition;

a controlling step by the second outputting filter of outputting the preview image of the image data to be output from the first outputting filter by using the determined parameter;

a controlling step by the second outputting filter of controlling the outputting process of the preview image of image data in which synthesizing image data to be synthesized corresponding to the finish processing condition are synthesized with the image data to be output from the outputting section by using the determined parameter;

a finish processing condition table forming step of forming a finish processing condition table in which the finish processing condition and a file name of the synthesizing image data corresponding to the finish processing condition are stored;

a database forming step of forming a database in which the synthesizing image data corresponding to the finish processing condition is stored;

an image data synthesis processing step of synthesizing the image data obtained from the preview image output from the second outputting filter with the synthesizing image data obtained from the database;

a searching step by the second outputting filter of searching for the file name of the synthesizing image data corresponding to the finish processing condition in the finish processing condition table by using the obtained finish processing condition;

a searching step of searching the database for the synthesizing image data corresponding to the file name of the synthesizing image data and obtaining the synthesizing image data; and an image data synthesis instructing step by the second outputting filter of instructing to synthesize the synthesizing image data identified by the file name corresponding to the finish processing condition with the preview image output by the second outputting filter, wherein when an instruction to display the preview image of the image data to be output from the image data outputting section is received, the second image data processing step and the second image data output controlling step are executed.

8. The image processing apparatus according to claim 1, wherein the synthesizing image data is an icon.

9. The image processing method according to claim 6, wherein the synthesizing image data is an icon.

10. The non-transitory computer readable recording medium of claim 7, wherein the synthesizing image data is an icon.

11. The image processing apparatus as claimed in claim 1, wherein the image processing apparatus further comprises an additional first outputting filter which controls the outputting process of the input image data in a way different from the first outputting filter, an additional finish processing condition table in which an additional finish processing condition and an additional file name of additional synthesizing image data corresponding to the additional finish processing condition, different from the finish processing condition and the file name stored in the finish processing condition table, respectively, are stored, and an additional database in which the additional synthesizing image data corresponding to the additional finish processing condition, different from the synthesizing image data stored in the database, is stored, wherein the searching section of the second outputting filter searches for the additional file name of the additional synthesizing image data corresponding to the additional finish processing condition in the additional finish processing condition table by using the additional finish processing condition, the image data synthesis processing section searches the additional database for the additional synthesizing image data corresponding to the additional file name of the additional synthesizing image data and obtains the additional synthesizing image data, and the image data synthesizes instruction section of the second outputting filter instructs the image data synthesis processing section to synthesize the additional synthesizing image data identified by the additional file name corresponding to the additional finish processing condition with the preview image output by the second outputting filter.

12. The image processing apparatus as claimed in claim 6, wherein the image processing apparatus further comprises an additional first outputting filter which controls the outputting process of the input image data in a way different from the first outputting filter, an additional finish processing condition table in which an additional finish processing condition and an additional file name of additional synthesizing image data corresponding to the additional finish processing condition, different from the finish processing condition and the file name stored in the finish processing condition table, respectively, are stored, and an additional database in which the additional synthesizing image data corresponding to the additional finish processing condition, different from the synthesizing image data stored in the database, is stored, wherein the searching step of the second outputting filter searches for the additional file name of the additional synthesizing image data corresponding to the additional finish processing condition in the additional finish processing condition table by using the additional finish processing condition, the image data synthesis processing step searches the additional database for the additional synthesizing image data corresponding to the additional file name of the additional synthesizing image data and obtains the additional synthesizing image data, and the image data synthesizes instruction step of the second outputting filter instructs the image data synthesis processing section to synthesize the additional synthesizing image data identified by the additional file name corresponding to the additional finish processing condition with the preview image output by the second outputting filter.

13. The image processing apparatus as claimed in claim 7, wherein the image processing apparatus further comprises an additional first outputting filter which controls the outputting process of the input image data in a way different from the first outputting filter, an additional finish processing condition table in which an additional finish processing condition and an additional file name of additional synthesizing image data corresponding to the additional finish processing condition, different from the finish processing condition and the file name stored in the finish processing condition table, respectively, are stored, and an additional database in which the additional synthesizing image data corresponding to the additional finish processing condition, different from the synthesizing image data stored in the database, is stored, wherein the searching step of the second outputting filter searches for the additional file name of the additional synthesizing image data corresponding to the additional finish processing condition in the additional finish processing condition table by using the additional finish processing condition, the image data synthesis processing step searches the additional database for the additional synthesizing image data corresponding to the additional file name of the additional synthesizing image data and obtains the additional synthesizing image data, and the image data synthesizes instruction step of the second outputting filter instructs the image data synthesis processing section to synthesize the additional synthesizing image data identified by the additional file name corresponding to the additional finish processing condition with the preview image output by the second outputting filter.

* * * * *